United States Patent [19]

Shigematsu et al.

[11] Patent Number: 5,420,832
[45] Date of Patent: May 30, 1995

[54] HALF HEIGHT MAGNETOOPTICAL-DISK RECORDING AND/OR REPRODUCING APPARATUS FOR A 5.25 INCH LARGE CAPACITY MAGNETOOPTICAL-DISK

[75] Inventors: Kazuo Shigematsu, Saitama; Yoji Tomono, Hiratsuka; Atsushi Ichikawa, Tsukuba; Toshiyasu Hattori, Minamiashigara, all of Japan

[73] Assignee: Hitachi, Ltd., Tokyo, Japan

[21] Appl. No.: 148,996

[22] Filed: Nov. 8, 1993

[30] Foreign Application Priority Data

Nov. 13, 1992 [JP] Japan .................................. 4-303494
Dec. 2, 1992 [JP] Japan .................................. 4-323337

[51] Int. Cl.$^6$ ............................................. G11B 11/00
[52] U.S. Cl. ................................. 369/13; 369/77.2; 369/44.14; 360/59
[58] Field of Search ...................... 369/13, 77.2, 77.1, 369/75.2, 215, 44.11, 44.13, 44.14, 44.17, 44.18, 44.33, 44.39, 44.22, 44.19, 44.21, 275.2, 75.1; 360/114, 59, 99.06; 365/122

[56] References Cited

U.S. PATENT DOCUMENTS

| | | | |
|---|---|---|---|
| 5,126,983 | 6/1992 | Ikegame et al. | 369/13 |
| 5,226,024 | 7/1993 | Mukawa | 369/13 |
| 5,268,882 | 12/1993 | Mukawa | 369/13 |
| 5,287,334 | 2/1994 | Iwabuchi et al. | 369/13 |

FOREIGN PATENT DOCUMENTS 57-024047 2/1982 Japan .
57-027449 2/1982 Japan .
59-203258 11/1984 Japan .

Primary Examiner—Georgia Y. Epps
Assistant Examiner—Ali Neyzari
Attorney, Agent, or Firm—Fay, Sharpe, Beall, Fagan, Minnich & McKee

[57] ABSTRACT

An optical disk recording and/or reproducing apparatus is provided which is capable of storing a large amount of information, transferring data at a high speed, supporting SCSI-1 and SCSI-2, and the reducing the size of the apparatus, particularly the height (to the so-called half height), The magnetooptical-disk recording and/or reproducing apparatus of the invention is of the same size as that of the 5.25-inch magnetic disk recording and/or reproducing apparatus of half height, or it is 146 mm wide, 203 mm deep, and 41.3 mm high. The front panel 1 has the cartridge slot 2 and cartridge ejection button 3 provided thereon so that a cartridge including a disk for recording and reproducing information is inserted in or ejected from the apparatus. The cartridge insertion slot 2 has a double flap provided so that at least one part of the double flap closes the slot, preventing dust from entering through the cartridge slot 2 except when the cartridge is inserted in or ejected from the apparatus, According to this invention, the magnetooptical-disk recording and/or reproducing apparatus can record information of 1 GB/side or above on the disk and has the size of half height.

12 Claims, 17 Drawing Sheets

FIG. IIA
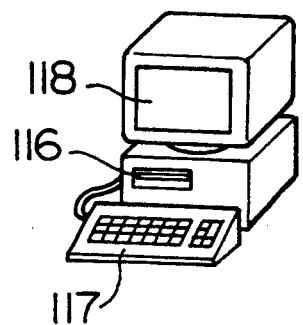
FIG. IIB
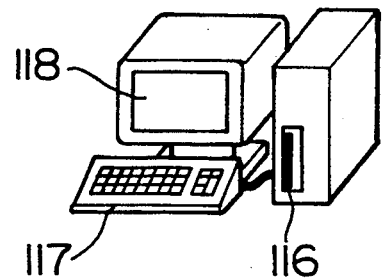
FIG. 12
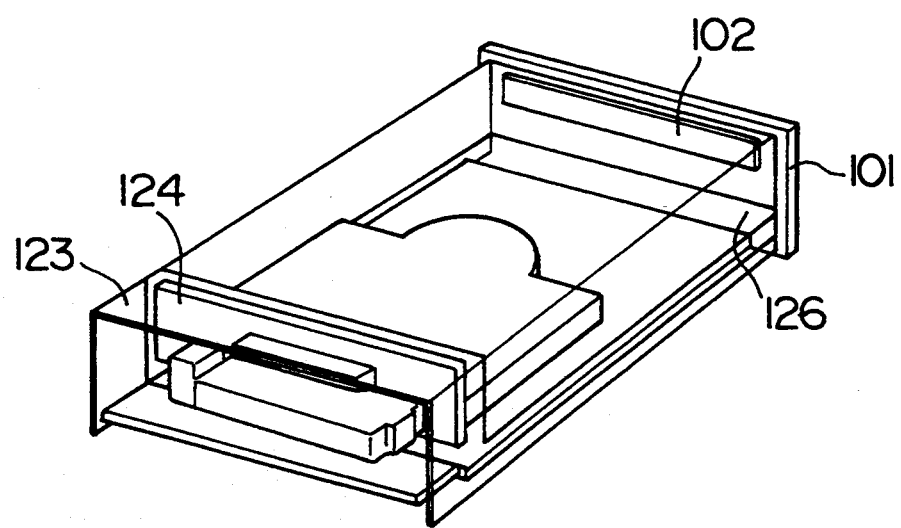

FIG. 15

| BAND NUMBER | SECTOR NUMBER | VFO CLOCK FREQUENCY |
|---|---|---|
| 0 | 59 | 49.8786 |
| 1 | 58 | 49.0332 |
| 2 | 57 | 48.1878 |
| 3 | 56 | 47.3424 |
| 4 | 55 | 46.4970 |
| 5 | 54 | 45.6516 |
| 6 | 53 | 44.8062 |
| 7 | 52 | 43.9608 |
| 8 | 51 | 43.1154 |
| 9 | 50 | 42.2700 |
| 10 | 49 | 41.4246 |
| 11 | 48 | 40.5792 |
| 12 | 47 | 39.7338 |
| 13 | 46 | 38.8884 |
| 14 | 45 | 38.0430 |
| 15 | 44 | 37.1976 |
| 16 | 43 | 36.3522 |
| 17 | 42 | 35.5068 |
| 18 | 41 | 34.6614 |
| 19 | 40 | 33.8160 |
| 20 | 39 | 32.9706 |
| 21 | 38 | 32.1252 |
| 22 | 37 | 31.2798 |
| 23 | 36 | 30.4344 |
| 24 | 35 | 29.5890 |
| 25 | 34 | 28.7436 |
| 26 | 33 | 27.8982 |
| 27 | 32 | 27.0528 |
| 28 | 31 | 26.2074 |
| 29 | 30 | 25.3620 |

FIG. 16

| BAND NUMBER | SECTOR NUMBER | VFO CLOCK FREQUENCY |
|---|---|---|
| 0 | 105 | 50.4630 |
| 1 | 104 | 49.9824 |
| 2 | 103 | 49.5018 |
| 3 | 102 | 49.0212 |
| 4 | 101 | 48.5406 |
| 5 | 100 | 48.0600 |
| 6 | 99 | 47.5794 |
| 7 | 98 | 47.0988 |
| 8 | 97 | 46.6182 |
| 9 | 96 | 46.1376 |
| 10 | 95 | 45.6570 |
| 11 | 94 | 45.1764 |
| 12 | 93 | 44.6958 |
| 13 | 92 | 44.2152 |
| 14 | 91 | 43.7346 |
| 15 | 90 | 43.2540 |
| 16 | 89 | 42.7734 |
| 17 | 88 | 42.2928 |
| 18 | 87 | 41.8122 |
| 19 | 86 | 41.3316 |
| 20 | 85 | 40.8510 |
| 21 | 84 | 40.3704 |
| 22 | 83 | 39.8898 |
| 23 | 82 | 39.4092 |
| 24 | 81 | 38.9286 |
| 25 | 80 | 38.4480 |
| 26 | 79 | 37.9674 |
| 27 | 78 | 37.4868 |
| 28 | 77 | 37.0062 |
| 29 | 76 | 36.5256 |
| 30 | 75 | 36.0450 |
| 31 | 74 | 35.5644 |
| 32 | 73 | 35.0838 |
| 33 | 72 | 34.6032 |
| 34 | 71 | 34.1226 |
| 35 | 70 | 33.6420 |
| 36 | 69 | 33.1614 |
| 37 | 68 | 32.6808 |
| 38 | 67 | 32.2002 |
| 39 | 66 | 31.7196 |
| 40 | 65 | 31.2390 |
| 41 | 64 | 30.7584 |
| 42 | 63 | 30.2778 |
| 43 | 62 | 29.7772 |
| 44 | 61 | 29.3166 |
| 45 | 60 | 28.8360 |
| 46 | 59 | 28.3554 |
| 47 | 58 | 27.8748 |
| 48 | 57 | 27.3942 |
| 49 | 56 | 26.9136 |
| 50 | 55 | 26.4330 |
| 51 | 54 | 25.9524 |
| 52 | 53 | 25.4718 |
| 53 | 52 | 24.9912 |
| 54 | 51 | 24.5106 |

FIG. 21

| PRECEDING CHANNEL BITS | INPUT BITS | FOLLOWING BITS | CHANNEL BITS RLL(1,7) |
|---|---|---|---|
| X | 0 0 | 0 X | 0 0 1 |
| 0 | 0 0 | 1 X | 0 0 0 |
| 1 | 0 0 | 1 X | 0 1 0 |
| 0 | 0 1 | 0 X | 0 0 1 |
| 0 | 0 1 | 1 X | 0 0 0 |
| 1 | 0 1 | 0 0 | 0 1 0 |
| 1 | 0 1 | not 0 0 | 0 0 0 |
| 0 | 1 0 | 0 X | 1 0 1 |
| 0 | 1 0 | 1 X | 0 1 0 |
| 0 | 1 1 | 0 0 | 0 1 0 |
| 0 | 1 1 | not 0 0 | 1 0 0 |

"NOT 00" MEANS 01, 10, 11
"X" MEANS THE VALUE IS EITHER 1 OR 0

FIG. 22

|  | 1 — 7 | 2 — 7 | RATIO |
|---|---|---|---|
| WINDOW WIDTH | 2T/3 | T/2 | 4/3 |
| MAXIMUM FREQUENCY | 3/(8T) | 1/(3T) | 9/8 |
| BANDWIDTH | 3/(4T) | 1/T | 3/4 |
| NYQUIST FREQUENCY | 3/(8T) | 1/(2T) | 3/4 |

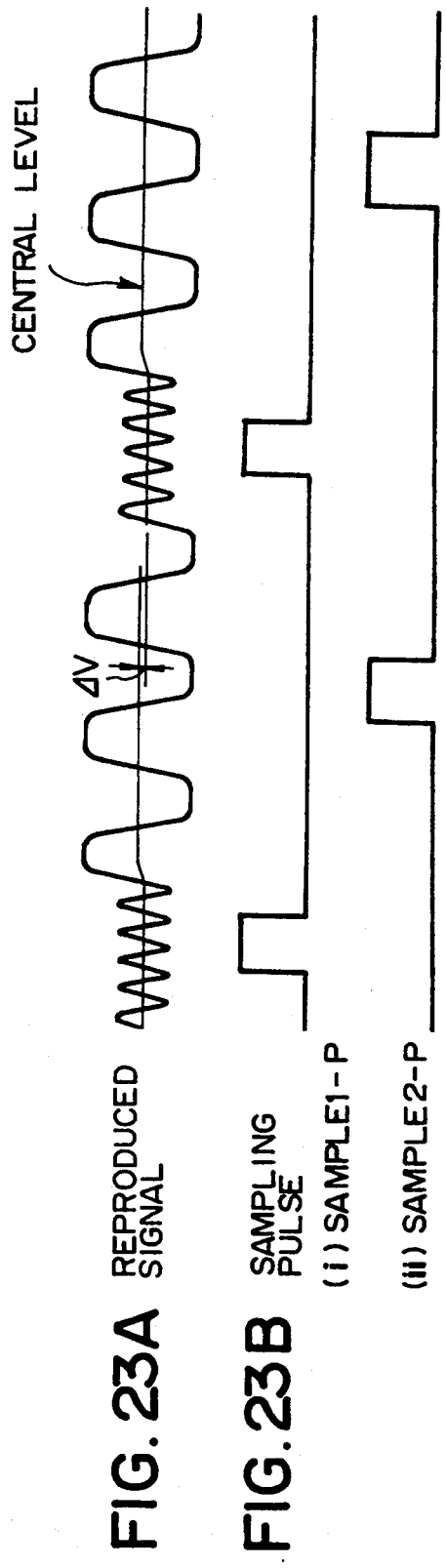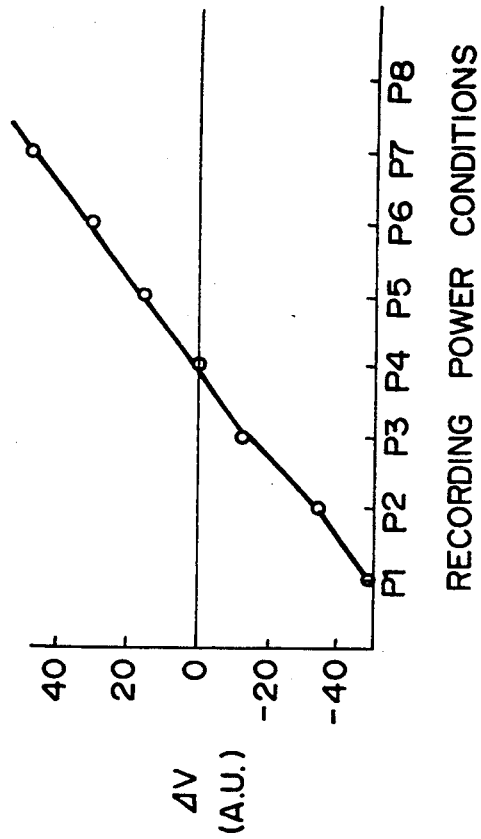
FIG. 23A REPRODUCED SIGNAL
FIG. 23B SAMPLING PULSE
(i) SAMPLE1-P
(ii) SAMPLE2-P
FIG. 23C

FIG. 24

| COMMAND | FLAG | | |
|---|---|---|---|
| 0 0 | 1 | 1 | x x x x x x |
| 0 1 | 1 | 0 | x x x x x x |
| 0 2 | 0 | 1 | x x x x x x |
| ⋮ | | | |
| F D | 0 | 1 | x x x x x x |
| F E | 1 | 0 | x x x x x x |
| F F | 0 | 0 | x x x x x x |

HALF HEIGHT MAGNETOOPTICAL-DISK RECORDING AND/OR REPRODUCING APPARATUS FOR A 5.25 INCH LARGE CAPACITY MAGNETOOPTICAL-DISK

BACKGROUND OF THE INVENTION

This invention relates to a recording and/or reproducing apparatus for a 5.25-inch large-capacity magnetooptical-disk.

The conventional 5.25-inch magnetooptical-disk recording and/or reproducing apparatus drives a magnetooptical-disk of 325 MB/side, which is standardized by ISO/IEC 10089, to rotate it at 2400 rpm, and records or reproduces information on or from each side of the disk. In this case, the data transfer rate is 920 KB/s. In addition, the interface to the host interface is SCSI-1, and the apparatus size is the same as the 5.25-inch magnetic disk recording and/or reproducing apparatus of full height (140 mm×208 mm×82.6 mm).

The bias magnetic field generator of the magnetooptical-disk recording and/or reproducing apparatus, upon recording, applies a vertical magnetic field to the recording medium in one direction, and upon erasing, applies the field to it in the other direction, or opposite direction. This magnetic field, in cooperation with the action of the very small light spot formed on the recording medium through an object lens, acts to erase data from or record data on the recording medium. The bias magnetic field generator is of the electromagnet coil type or of the permanent magnet type.

The conventional bias magnetic field generator of the electromagnet coil or permanent magnet type is so provided that the light spot can be formed along the center line of the bias magnetic field generator on the recording medium. An example of the provision of an electromagnet coil on the opposite side of the recording medium to the object lens is described in JP-A-59-203258. An example of the provision of an electromagnet on the object-lens side of the recording medium is described in JP-A-57-27449. On the other hand, an example of the provision of a permanent magnet on the opposite side of the recording medium to the object lens is described in JP-A-57-24047. However, there is no idea that the permanent magnet is disposed on the object-lens side of the recording medium.

SUMMARY OF THE INVENTION

Accordingly, it is an object of the invention to provide a novel magnetooptical-disk recording and/or reproducing apparatus which can meet the user's various demands.

The user ardently demands a new-type apparatus of a large capacity, high data transfer rate, SCSI-1 and 2 support, and small size, particularly low height (, or the so-called half height) over the conventional 5.25-inch magnetooptical-disk recording/reproducing apparatus. In addition, the problem of dust collecting in the conventional optical disk apparatus must be solved. The standard disk of 325 MB/side which meets the specification ISO/IEC 10089 is also demanded to have the recording and/or reproducing function (the so-called backward compatibility).

Moreover, the apparatus must be able to be placed with its side down as well as with its top up. The housing designed for the conventional magnetic disk apparatus must also be able to be simply used in the magnetooptical-disk apparatus. Of course, it must also be able to use various disks of many makers such as the second vendors or third vendors.

The increase of the storage capacity can be achieved by use of the mark length recording system, ZCAV (Zoned Constant Angular Velocity) recording system and the combination of a 780-nm or 670-nm semiconductor laser and a large NA (Numerical Aperture) (for example, 0.55 or above) object lens.

In the CAV recording system the recording density decreases in proportion to the radius of the disk, while in the ZCAV recording system the recording region of the disk is divided into a large number of zones in the radius direction so that the recording density is kept substantially constant in the radius direction of the disk. Therefore, in the ZCAV recording system the storage capacity can be increased to about 1.5 times as large as that in the conventional CAV recording system.

The mark length recording was difficult for the magnetooptical-disk because the optimum recording power greatly depends on the environmental temperature and because the thermal diffusion of the recording film is large. However, it can be achieved by use of the double PLL (Phase Locked Loop) system, trial writing control system, 1-7 modulation system and direct edge detection system.

The mark length recording system is able to increase the storage capacity theoretically twice as large as the mark position recording system (in which a piece of information is recorded by a single recording mark) because two pieces of information can be recorded by a single recording mark. In practice, the mark length recording system has a difficulty of its own, and thus it is possible to achieve about 1.7-times increase of storage capacity. Particularly, since the magnetooptical-disk recording is substantially thermomagnetic, the mark length to be recorded greatly depends on the temperature and recording sensitivity of the disk, and thus it is difficult to record each mark length which has information on its edge. However, since the disk temperature and the recording power are not suddenly changed, the mark length expansion or compression is substantially constant within one sector as a unit for recording.

Therefore, since a desired distance can be obtained between the front edges or rear edges, correct data can be discriminated from the reproduced signal even under slight expansion or compression of mark length by the action of data discrimination PLL separately to each of the front edge and the rear edge (double PLL). Use of the double PLL system makes it possible to allow for slight expansion or compression of mark length, but the high-density recording, or large increase of storage capacity is substantially difficult to realize by only the double PLL. Since the magnetooptical-disk medium has a very large thermal diffusion constant, the increase of the recording density will affect the resolution of the reproduced signal.

The trial writing control is the new technique for obviating this difficulty to achieve great increase of storage capacity. In other words, a proper time after the disk is loaded into the apparatus, trial writing is made on one or more particular regions of the disk in order to search for optimum recording power and thereby to remove the effect of the temperature and sensitivity of the disk and make correct mark length recording. The trial writing control is also used for the recovery of recording error. When a certain kind of recording error occurs (for example, when the number of error bytes within one sector exceeds 30 bytes), trial writing is made to reset the optimum recording power, and recording is again performed.

Since the 1-7 modulation system has a wider window width for data discrimination than the 2-7 modulation system, an allowable edge position variation in mark length recording is large. Also, since the 1-7 modulation system employs a narrow frequency band, it has a high S/N ratio and is suited to increase the recording density.

In the direct edge detection system, since noise in the high-frequency region is not amplified, the S/N ratio can be improved and thus recording density can be increased as compared with the differential detection system.

In the ZCAV recording system, since the data transfer rate changes in each zone, clocks of different oscillation frequencies are necessary to control the data transfer rate, thus making the circuit system complicated. Therefore, this ZCAV recording system was thought not to be suited for a small size apparatus. However, use of a large-scale-integrated synthesizer will solve this problem without making the circuit system complicated.

A 780-nm or 680-nm semiconductor laser and a large-NA (0.55 or above) object lens are used to reduce the size of the light spot. In general, when the light spot size is reduced, the distortion of the reproduced signal is increased with the aberration and defocus of the optical spot, thus reducing the reliability of data. This problem can be solved by adding an equalizing circuit to the reproducing circuit system.

In addition, a 780-nm or 670-nm semiconductor laser and a large-NA (for example, 0.55) focus lens are used to reduce the light spot size as about 1/1.1 or 1/1.3 compare with the combination of a 830-nm semiconductor laser and 0.53-NA focus lens and hence the recording density can be increased about 1.2 times or 1.6 times.

Since the equalizing circuit added to the reproducing system can compensate for the reduction of the resolution due to the aberration and defocus of the light spot, the reproduced signal can be stably obtained and correct data can be reproduced from the high-density recorded disk.

The data transfer rate can be increased together with the increase of storage capacity by rotating the disk at 2400 rpm or above as in the prior art since the large storage capacity results in increase of bit density.

A microprogram for controlling the SCSI controller is contrived in order to support both host interface SCSI-1 and SCSI-2, and thereby the microprogram is not greatly increased.

The half height of the apparatus size can be achieved by using a single main circuit board and thin mechanical system. The realization of a single main circuit board can be promoted by the large-scale integration of the circuit system. The difficulty in realizing a thin mechanical system occurs in the recording/erasing magnetic field generation mechanism. In general, the recording/erasing magnetic field generation mechanism is a rotating magnet or electromagnetic coil. In the conventional apparatus, either one of the magnet and electromagnetic coil is disposed on the opposite side of the disk to the optical head, thus remarkably preventing the half height design. For the half height design of the apparatus, it is effective to reduce the size of the recording/reproducing magnetic field generation mechanism and to place it on the same side as the optical head.

The now practically used magnetooptical-disk medium of, for example, 130 mm in diameter, needs to be applied with a bias magnetic field of 18000 A/m to 48000 A/m vertically up or down, and with the laser spot. The bias magnetic field generator is required to apply a magnetic field of the above intensity on the surface of the recording medium on which the beam spot is formed. In this case, the magnetic field must be applied on the recording film through a disk substrate of 1.2 mm thick of which the surface is vibrating at an amplitude of about 0.4 mm. Therefore, in the electromagnet coil system, although erasing and recording operations can be switched by only changing the direction of the current which is caused to flow in the electromagnet coil, the electromagnet coil becomes large since it has a necessary product of the number of turns of the electromagnet coil and the current flowing in the coil, or a necessary ampereturn. Thus, it is very difficult to mount this coil on the object lens. Although the electromagnet coil can be provided adjacent to the object lens, the distance between the focused beam spot and the electromagnet coil is great, and thus the necessary ampereturn is further increased. For example, the electromagnet coil is required to have a thickness, or height of about 10 mm, and thus it is difficult to provide the electromagnet coil of a practical size on the object lens side. Thus, because of the above aspects, the electromagnet coil is generally provided on the opposite side of the recording medium to the object lens.

On the other hand, in the permanent magnet system, the magnet itself can be produced to be smaller than the electromagnet. There is an example of the bias magnetic field generator for rotating the permanent magnet of which the diameter is in a range from 3 to 4 mm. In this case, since it is necessary to rotate the permanent magnet in order to switch the erasing and recording operations, the magnet system still requires a space of which the height is about 10 mm including the height of the rotation support mechanism of the permanent magnet and the height of the attached mechanical portion of the drive coil and so on. Therefore, it is difficult to mount the permanent magnet on the object lens drive, and thus in the prior art the permanent magnet is not provided on the object lens side.

Since the bias magnetic field generator is provided on the opposite side of the recording medium to the object lens as described above, the optical disk recording/reproducing apparatus must have a total height of the object lens drive actuator height, optical disk cartridge height and bias magnetic field generator height, and thus there is a difficulty in reducing the height.

According to this invention, the permanent magnet type bias magnetic field generator can be provided on the object lens side of the optical disk, or recording medium so that the apparatus can be small-sized and reduced in its height.

As to the dust prevention means, a cartridge including a disk is loaded into the apparatus, and the optical head and the disk can be shut out from the outside and tightly closed. Thus, the dust provision of this magnetooptical-disk apparatus can be greatly improved over that of the conventional optical disk apparatus. When the apparatus is tightly closed, the temperature within the apparatus will greatly increase, but it can be solved by placing the single circuit board out of the closed space.

As to the so-called backward compatibility function, two functions are incorporated in one apparatus, and thus generally make the apparatus complicated, and therefore it is said that the half height of apparatus is difficult. However, if the physical shapes of the disk of 1 GB/side or above and the cartridge are made coincident with those of the cartridge and disk which are standardized under the specification ISO/IEC 10089, the mechanical system can be shared. Since the optical head is improved to have a smaller beam spot than in the conventional recording and/or reproducing apparatus and thus is able to obtain data at a high resolution, there is no problem even in sharing the mechanical system. Therefore, a problem will occur with the circuit system. However, since the servo/access system can be used by changing the gain of the servo system and by slight change of the logic, the number of elements of the circuit system is almost not increased. The recording and reproducing systems are different in the recording method (pit position recording and mark length recording) and modulation code (2-7 modulation and 1-7 modulation), and thus two different systems are fundamentally necessary for recording and reproduction. Therefore, for use of a single circuit board including all the circuits, it is naturally necessary to increase the rate of the large-scale integration, and further it is necessary to make sharing as much as possible and to thereby decrease the number of circuits. To this end, if a recording format is contrived for 1 GB/side or above, the clock for recording and reproduction can be produced as one of the outputs from the above-mentioned synthesizer. In other words, one crystal oscillator can be saved which is normally used to produce a new recording and reproducing clock in order to make the backward compatibility function. In addition, one part of the above-mentioned double PLL for mark length recording may be used for the PLL for data discrimination.

When the apparatus is designed to be capable of being set up normally, or with its top up and set with its side down, a problem is caused with the two-dimensional actuator. The two-dimensional actuator is desired to be of the pin support type when considering the high-speed access performance. However, when the apparatus is placed with its top or with its side down, the life of the pins may be shortened. If a gravity compensation mechanism is added, the life can be prevented from being shortened, and thus the apparatus can be placed in both top-up position and side-down position.

In order that the housing for the magnetic disk can be directly used for the magnetooptical-disk without change, it is necessary to make the size of the magnetooptical-disk apparatus coincident with that of the magnetic disk apparatus (, or make the half height), make the tapped holes for fixing to the housing at the same positions as in the magnetic disk apparatus, and provide the connector for the interface SCSI to the host apparatus at the back of the apparatus.

BRIEF DESCRIPTION OF THE DRAWINGS

FIGS. 11A and 11B show examples of the use of the magnetooptical-disk recording and/or reproducing apparatus of the invention in an information processing system.

FIG. 12 is a perspective view of one embodiment of the magnetooptical-disk recording and/or reproducing apparatus of the invention.

FIG. 15 is a table showing one example of the zone division in the user's region of the disk.

FIG. 16 is a table showing another example of the zone division in the user's region of the disk.

FIG. 21 is a table showing the modulation rule of the 1-7 modulation system.

FIG. 22 is a table showing the comparison between the characteristics of the 1-7 modulation system and 2-7 modulation system.

FIGS. 23A, 23B and 23C are diagrams useful for explaining the trial writing control system, and respectively show the reproduced signal, the sampling pulses and the recording power conditions.

FIG. 24 shows one example of the table of the support command.

DESCRIPTION OF THE PREFERRED EMBODIMENTS

An embodiment of the invention will be described with reference to the accompanying drawings.

Figure 1:
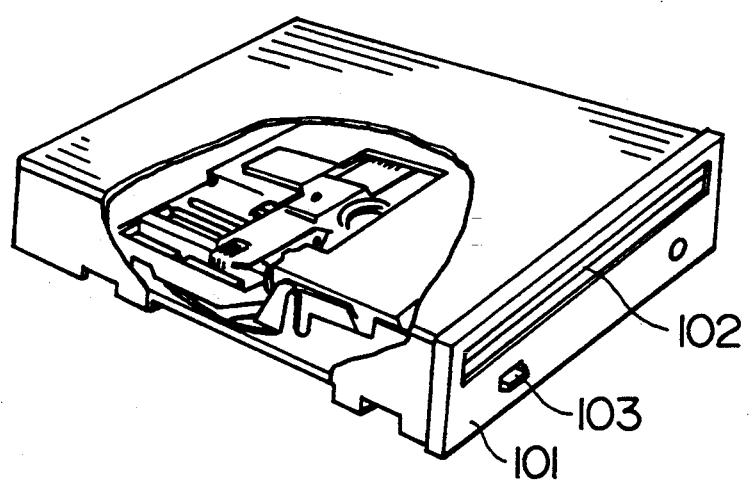
FIG. 1 is an exterior view of one embodiment of a magnetooptical-disk recording and/or reproducing apparatus of the invention.

FIG. 1 is an exterior view of one embodiment of the magnetooptical-disk recording and/or reproducing apparatus of the invention. This magnetooptical-disk recording and/or reproducing apparatus has the same size as the 5.25-inch half-height magnetic disk recording and/or reproducing apparatus. The external size is 146 mm wide, 203 mm deep, and 41.3 mm high. The front panel, 101, of the apparatus has a slot 102 for the cartridge and an ejection button 103 for the cartridge. Thus, the cartridge having housed therein a disk for recording and/or reproducing information can be manually inserted into or ejected from the apparatus. The slot 102 for the cartridge has two flaps provided so that at least one of the flaps closes the slot except when the cartridge is inserted or ejected, thereby minimizing the dust which will enter into the slot 102.

Figure 2A:
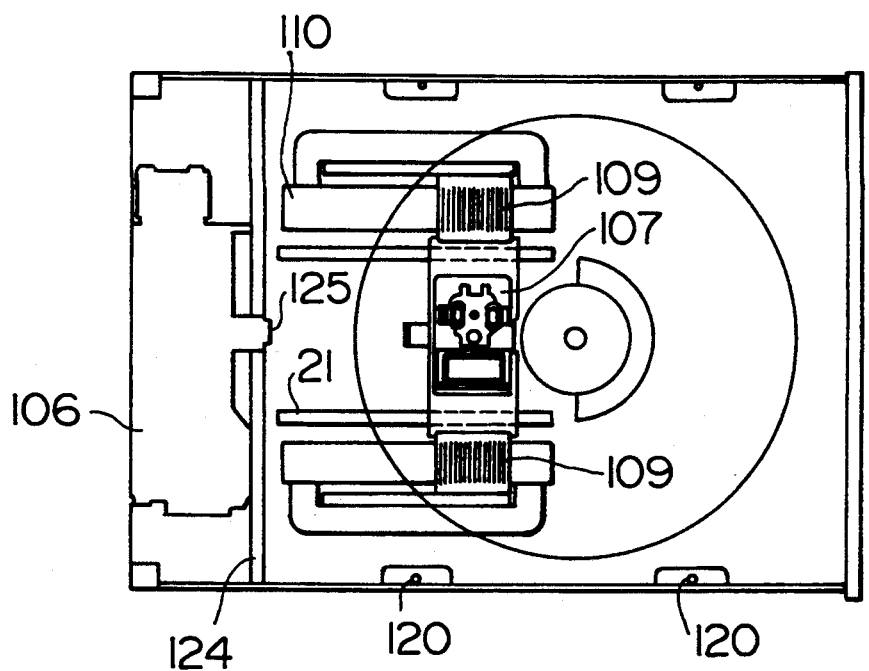
FIGS. 2A and 2B are views of the mechanism of the magnetooptical-disk recording and/or reproducing apparatus shown in FIG. 1.
Figure 2B:
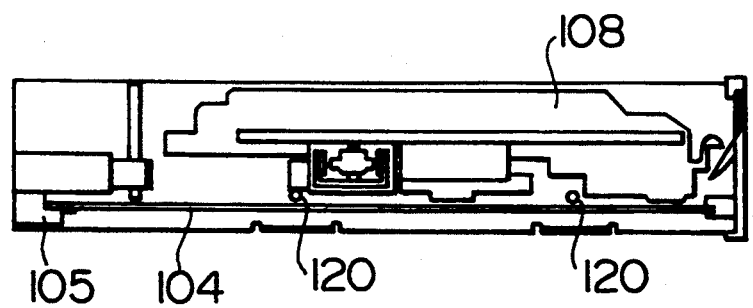

FIGS. 2A and 2B show the construction of a main part of the magnetooptical-disk recording and/or reproducing apparatus illustrated in FIG. 1. FIG. 2A is a front view of the apparatus, and FIG. 2B is a side view of the apparatus.

A circuit board 104 having main circuit components connected is mounted in the apparatus with its component side facing the bottom of the apparatus so that the components can be easily cooled. A connector 105 for the SCSI interface is provided at the back end of this circuit board 104 so that the interface cable can be connected to or disconnected from the back of the apparatus. When this apparatus is placed in a separate housing and used, this apparatus is fixed to the housing at tapped holes 120 which are provided at the same positions as those in the 5.25-inch like-size (half height) magnetic disk recording and/or reproducing apparatus.

Figure 3:
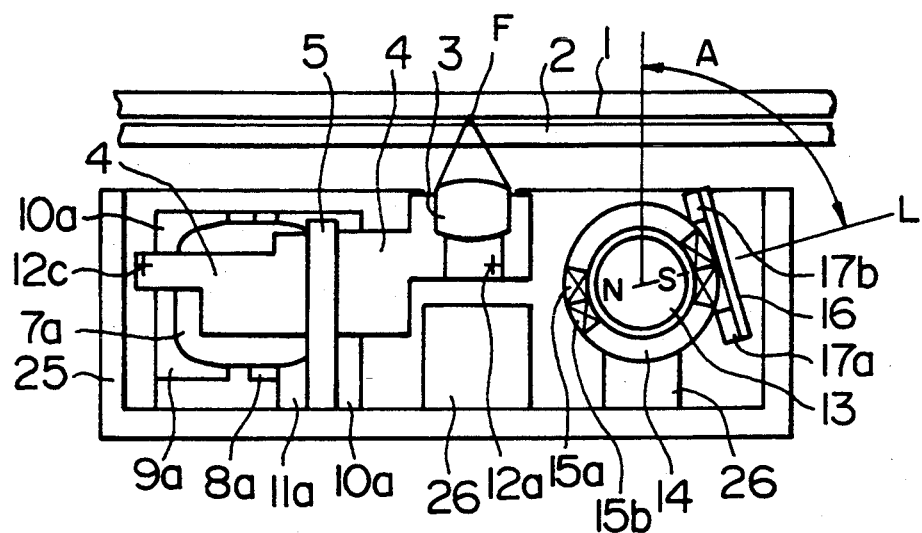
FIG. 3 is a cross-sectional view of a main part of an example of the movable head which is used in the magnetooptical-disk recording and/or reproducing apparatus of the invention.
Figure 4:
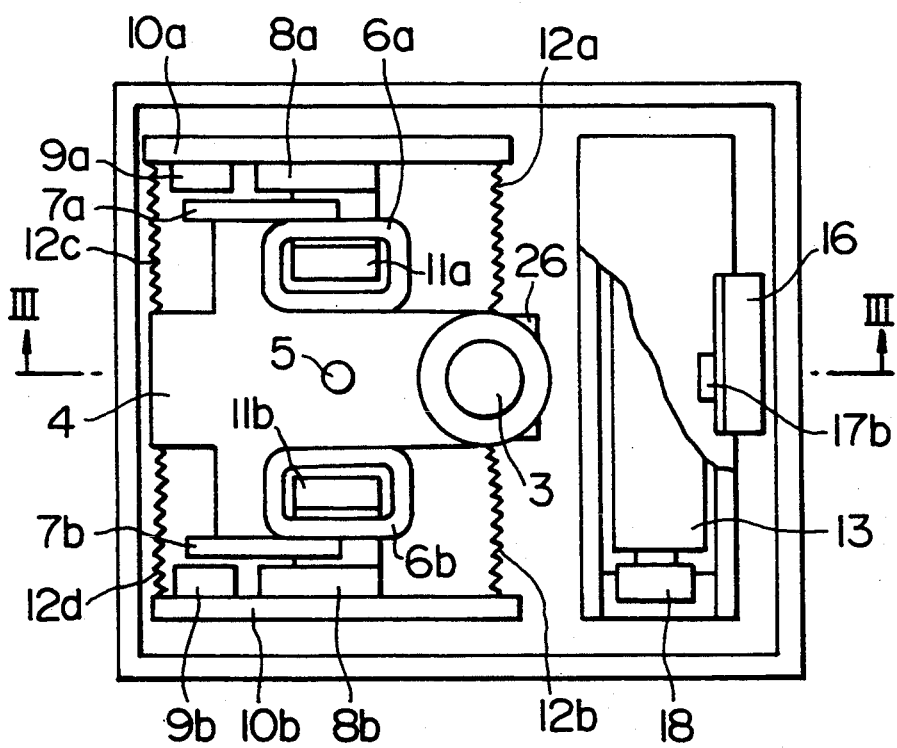
FIG. 4 is a plan view of the main part of the example of the movable head shown in FIG. 3.

The optical head for recording and/or reproducing a signal has two portions, or a fixed portion 106 and a movable portion 107. The movable portion 107 includes one carriage case 25, and has the pin support potation type two-dimensional actuator and the rotatable magnet mounted on this carriage case 25 as shown in FIGS. 3 and 4. The movable portion 107 including the carriage case 25 is 13.5 mm high and is much thinner than that of the conventional optical head. In addition, since the magnet for recording and erasing which is provided on the opposite side of the disk to the optical head in the prior art is provided on the optical-head side, no space is necessary in which the magnet or electromagnetic coil is provided on the cartridge holder, 108, thus greatly contributing to the reduction of the height of this apparatus.

The bias magnetic field generator is provided along the surface of the magnetooptical-disk recording medium and on the opposite side of the object lens to the object lens drive and support means.

The permanent magnet of the bias magnetic field generator and the rotating means for this permanent magnet can be housed in a tightly closed container. In this case, the drive coil for driving the permanent magnet is integrally formed to be buried in this tightly closed container as a part of the container.

The permanent magnet itself of the bias magnetic field generator is constructed to rotate as a rotor. It can be driven to rotate by the magnetic field from the permanent magnet and the drive current flowing in the drive coil of the permanent magnet. In this case, the permanent magnet is magnetized in the direction of the rotation diameter, and the drive coil of the permanent magnet can be constructed to have a portion which faces both the N-pole and S-pole of the permanent magnet and which is parallel to the rotation axis of the permanent magnet.

Also, in this case, the permanent magnet can be disposed on the opposite side of the object lens to the object lens drive and support means in such a manner that the rotation axis of the permanent magnet is parallel to the surface of the magnetooptical-disk and in the radius direction of the disk.

As described above, when an electromagnet coil is used for the bias magnetic field generator, the electromagnet coil size becomes large because of a necessary ampereturn, and thus it is difficult to mount the electromagnet coil on or close to the object lens.

On the other hand, the permanent magnet is difficult to be incorporated on the object lens drive because it requires a rotation mechanism as described above. However, since a strong permanent magnet is already developed, this strong permanent magnet of several mm in diameter can be used to apply a magnetic field of the above-given value, 18000 A/m or above to the focused beam spot when it is provided on the object lens side of the recording medium and close to the object lens drive.

FIGS. 3 and 4 show a main portion of the optical movable head in one embodiment of the invention. This head is of the separation optical system type in which only the portion around the object lens is moved in the radius direction of the recording medium and most part of the optical system is housed in the fixed portion. FIG. 4 is a plan view of the main portion of the optical movable head, and FIG. 3 is a cross-sectional view taken along a line III—III in FIG. 4.

Figure 5A:
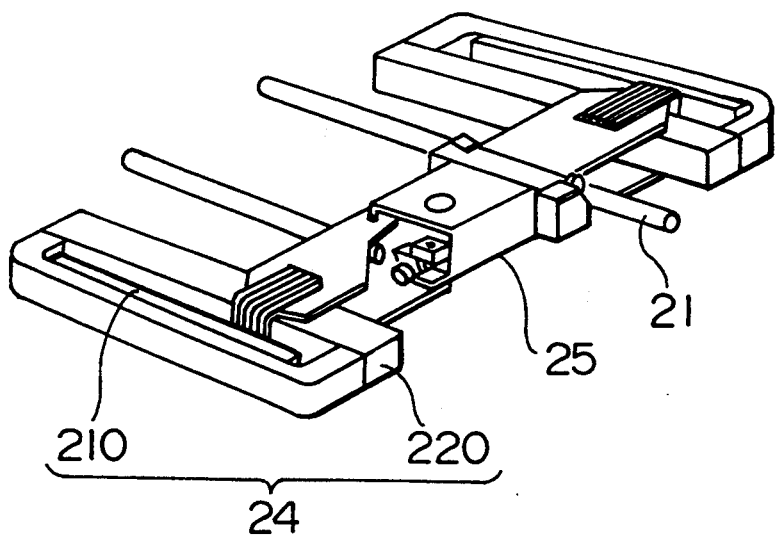
FIGS. 5A and 5B are respectively perspective and front views of the movable head of the magnetooptical-disk recording and/or reproducing apparatus.
Figure 5B:
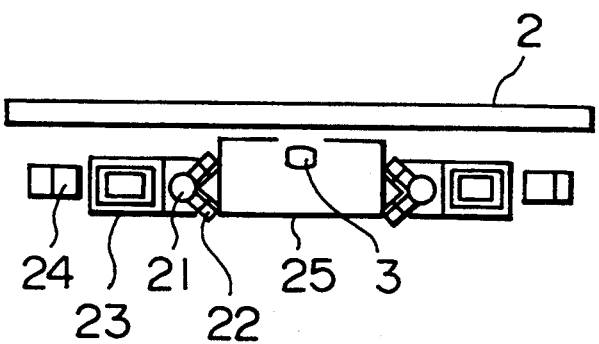

The carriage case 25 shown in FIGS. 3 and 4 has course coils (drive coils) 23 mounted at the opposite ends as shown in FIGS. 5A and 5B. The movable portion 107 can be moved at a high speed in the radius direction of the disk by the drive coils and magnetic circuits 24. The carriage case 25 is guided by ball bearings 22 along guide shafts 21. The magnetic circuit 24 has a magnet 210 and a yoke 220 provided in parallel to the surface of the inserted disk. Thus, the height of the magnetic circuit 24 can be considerably reduced to as low as 9.5 mm.

The fixed portion 106, though not shown in detail, has a semiconductor laser mounted as a light source. The laser beam emitted from the semiconductor laser is converted into a parallel beam by a collimator lens, and further converted into a substantially-circular parallel beam by a beam shaping prism. This beam is then conducted into the movable portion 107. The laser beam from the movable portion 107 is separated into a desired luminous flux by a beam splitter which is provided within the fixed portion 106. This luminous flux is received by an optical detector which has a photosensitive portion of a desired shape. This optical detector is used to reproduce a preformat signal which is formed at the very small pits on the disk surface, detect the control signals for focus servo and tracking servo, and reproduce a magnetooptical signal.

The carriage case 25 having the two-dimensional actuator and bias magnetic field generator mounted is disposed to face the magnetooptical-disk which has the substrate 2 and the recording film 1 formed on the base. The carriage case 25, as shown in FIGS. 5A and 5B, is guided by the ball bearings 22 along the guide shafts 21 which are fixed to a base not shown, and can be moved in the radius direction (perpendicular to the drawing sheet of FIGS. 3, 5A and 5B) of the magnetooptical-disk. The drive coils 23 are mounted on the opposite ends of the carriage case 25 and interact with the magnetic circuits 24 so as to produce an electromagnetic force, by which the carriage case 25 is moved in the radius direction of the magnetooptical-disk.

The carriage case 25 includes, as shown in FIGS. 3 and 4, the two-dimensional actuator for moving the object lens 3 both in the direction perpendicular to the magnetooptical-disk surface (perpendicular to the drawing sheet of FIG. 4), or in the AF (automatic focusing) direction, and in the radius direction of the magnetooptical-disk (parallel to the drawing sheet of FIG. 4), or in the TR (tracking) direction. The carriage case 25 also includes a beam raising mirror 26 which is disposed at an angle of 45 degrees in order to reflect at right angles the parallel beam which enters into the carriage case 25 from the fixed optical system. In addition, the carriage case 25 includes the bias magnetic field generator which applies a vertical bias magnetic field to the recording film 1. The two-dimensional actuator has a movable portion on which the object lens 3 is mounted, a support shaft 5 for slidably supporting the movable portion, and a magnetic circuit. The movable portion is formed of a lens support member 4 which has the object lens 3 mounted at its tip, AF (automatic focus) coils 6a, 6b which are fixed on both sides of the central portion of the lens support member 4, and TR (tracking) coils 7a, 7b which are fixed to both sides of the rear portion of the lens support member 4. The lens support member 4 has a guide aperture bored at the center of the gravity of the movable portion. The support shaft 5 is engaged in the guide aperture so as to guide the movable portion to move straight in the AF direction and to rotate around the support shaft 5. The magnetic circuit has a back yoke 10a, 10b, magnets 8a and 9a, 8b and 9b of opposite polarities fixed to the yoke (if the front side and back side of the magnet 8a are the polarity N and S, respectively, the front side and back side of the magnet 9a are the polarity S and N, respectively). The back yoke 10a, 10b has a center yoke 11a, 11b connected on the bottom of the carriage case 25 as shown in FIG. 4. The main portion of this center yoke 11a, 11b is upright within the AF coil 6a, 6b. A part of the AF coil 6a, 6b is inserted between the magnet 8a, 8b and the center yoke 11a, 11b. The object-lens side of the TR coil 7a, 7b is inserted between the magnet 8a, 8b and the center yoke 11a, 11b, and the opposite side thereof faces the magnet 9a, 9b. The extensions of the back yoke 10a, 10b and the lens support member 4 are connected by support springs 12a through 12d so that the object lens 3 can be aligned with reference positions in the direction perpendicular to the magnetooptical-disk surface and in the radius direction of the magnetooptical-disk.

As illustrated in FIG. 4, the magnetic flux passing between the front side of the magnet 8a, 8b and the center yoke 11a, 11b crosses the coil 6a, 6b, and the magnetic flux passing between the front side of the magnet 9a, 9b and the front side of the magnet 8a, 8b crosses the coil 7a, 7b. When a current is caused to flow in the AF coil 6a, 6b, the forces exerted on both the coils are in the same direction (if an upward force is exerted on the coil 6a, an upward force is also exerted on the coil 6b). When a current is caused to flow in the TR coil 7a, 7b, the forces exerted on both the coils are in the opposite directions (in FIG. 4, if a rightward force is exerted on the coil 7a, a leftward force is exerted on the coil 7b).

As illustrated in FIG. 4, since the AF coils (6a, 6b) and TR coils (7a, 7b) as drive means, all magnetic circuits 8 through 11, the support springs 12a through 12d as support means and the fixing means are all provided on the support pin side of the object lens tip in the direction (along the line III—III in FIG. 4) in which the object lens 3 and the support pin 5 are connected (, or since those elements are disposed only on the left side of the object lens 3 as illustrated in FIGS. 3 and 4), the bias magnetic field generator will be described below can be easily provided with almost no spatial problem being caused by the two-dimensional actuator of the object lens drive means (, or without being obstructed by the actuator). Consequently, the distance between the bias magnet and the beam spot focused point F (the focal point of the object lens 3 on the recording film 1) can be reduced, and the intensity of the bias magnetic field at the beam spot focused point can be assured even if the bias magnet size is small.

Since the bias magnetic field generator of the permanent magnet is mounted on the movable head so that it is disposed on the object lens side of the recording medium and equal to or lower than the height of the object lens or the object lens drive, it is possible to sufficiently reduce the distance between the permanent magnet and the beam spot focused point on the recording medium. Also, the vertical magnetic field of an intensity necessary for the erasing and recording operations can be generated and applied at the beam spot focused point by the small bias magnetic field generator. In addition, the magnetooptical-disk recording and/or reproducing apparatus can be small-sized and reduced in its height.

Since the bias magnetic field generator including the permanent magnet cannot be disposed under the beam spot, the bias magnetic field generator in this embodiment is provided on the opposite side of the object lens to the object lens drive and support means and along the recording medium surface, thereby making it possible to reduce the height of the apparatus. If the magnetic pole of the permanent magnet is tilted from the direction perpendicular to the recording medium, the magnetic field component perpendicular to the recording medium can be further strengthened at the beam spot focused point.

Since the permanent magnet and the means for rotating this magnet are placed in a tightly closed container, and since the permanent magnet drive coil is buried in this tightly closed container by molding or the like as a part of the container, the bias magnetic field generator can be further small-sized and reduced in its height.

Moreover, since the permanent magnet itself is formed as a rotor, and driven to rotate by the force due to the interaction between the magnetic field from the permanent magnet and the current flowing in the permanent magnet drive coil, a special mechanism for the rotation of the permanent magnet is not necessary.

The bias magnetic field generator including the permanent magnet is provided on the opposite side of the object lens to the object lens drive and support means on the movable head as described above. The permanent magnet is magnetized in the rotation diameter direction and its rotation axis is parallel to the surface of the recording medium and lies in the radius direction of the recording medium. The magnetic field from the permanent magnet is symmetrical with respect to the center of the magnetization, and the magnetic lines of force emerge from the N-pole of the permanent magnet, pass through the beam spot focused point, and turn 360 degrees, entering the S-pole. Since the permanent magnet is located not just under the beam spot focused point but slightly deviated therefrom, the angle of the magnetic field at the beam spot focused point is substantially determined by the relative position of the permanent magnet. Thus, by setting the rotation angle of the permanent magnet a predetermined value, it is possible that the intensity of the magnetic field perpendicular to the recording medium at the beam spot focused point is brought to a certain range (desirably to the maximum value). The permanent magnet is set to a rotational position (reference angle) at which the vertical field component at the beam spot focused point from one pole is the maximum, and to the other rotational position which is 180 degrees larger than this reference angle and at which the vertical field component at the beam spot focused point from the other (opposite) pole is the maximum. One of these angular positions is for the erasing mode, and the other one is for the recording mode. Since the permanent magnet is set at these positions, the distance between the beam spot focused point and the permanent magnet can be reduced so that a large magnetic field can be applied at the beam spot focused point.

In order to set the permanent magnet at the two different angular positions, it is necessary to use rotation drive means and angle setting means. According to this invention, the permanent magnet itself is used as a rotor for the rotation means, and the drive coil as a fixed part is simply placed in the magnetic field which is generated therefrom. This drive coil is formed of a pair of saddle-type coils which are opposite to the N-pole and S-pole of the permanent magnet and have portions parallel to the rotation axis of the permanent magnet. A rotating effect is generated by the interaction between the current flowing in the coils and the magnetic field from the permanent magnet.

The angle setting means can be realized by use of a mechanical stopper or by a pulse motor which is used as the rotation means and to electromagnetically set the angles. According to this invention, considering the accuracy of operation and the reduction of the time necessary for the magnet to be completely stopped after rotation, the detection means is provided for rotation angles, and the output from the detection means is fed back to the drive coil in order to rotate the permanent magnet of the small-size, small rotation radius and low rotation moment. Thus, the permanent magnet as a rotor can be controlled to turn 180 degrees at a high speed and to be stably and accurately held at the two angular positions.

Figure 6:
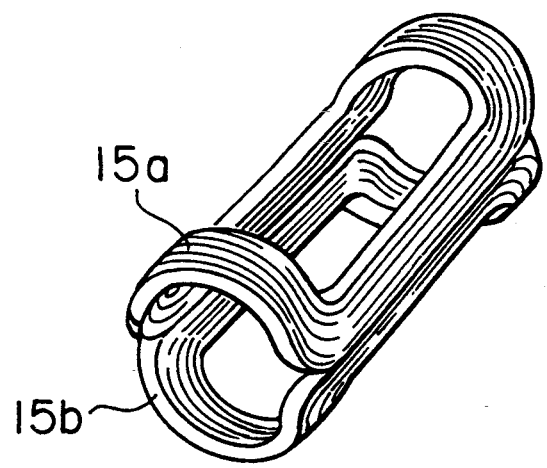
FIG. 6 is a perspective view of a saddle-shaped coil for the bias magnet drive.
Figure 7:
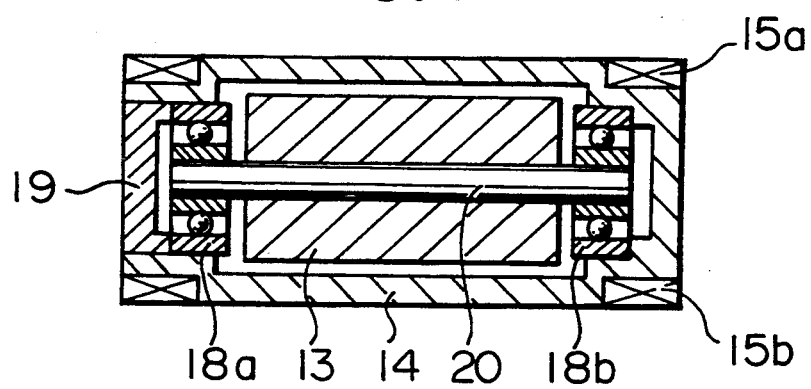
FIG. 7 is a cross-sectional view of the bias magnetic field generator.

The construction of the bias magnetic field generator will be described with reference to FIGS. 6 and 7. FIG. 6 is a perspective view of the bias magnet drive saddle-type coils. FIG. 7 is a cross-sectional view of the bias magnetic field generator. A bias magnet 13 magnetized in one direction perpendicular to the center axis is rotatably supported by a shaft 20 which is inserted in an aperture provided at the center, and by ball bearings 18a, 18b engaged with the opposite ends of the shaft 20.

The ball bearings 18a, 18b are inserted and supported in a coil cover 14 which is molded in a cylindrical shape with one end closed. The coil cover 14 has saddle coils 15a, 15b integrally buried and fixed therein by molding. The opening side of the coil cover 14 is closed by a lid 19, and the coil cover 14 and the lid 19 are engaged and bonded to be fixed. Two Hall elements 17a, 17b are mounted on a sensor support plate 16. The sensor of the two Hall elements is fixed at the coil-butt region of the coil cover 14. The coil cover 14 is supported by a bias magnet holder 26 in such a manner that the line, L along the coil-butt region at which the two saddle-type coils are combined is tilted an angle A from the line perpendicular to the magnetooptical-disk as shown in FIG. 3.

Figure 8:
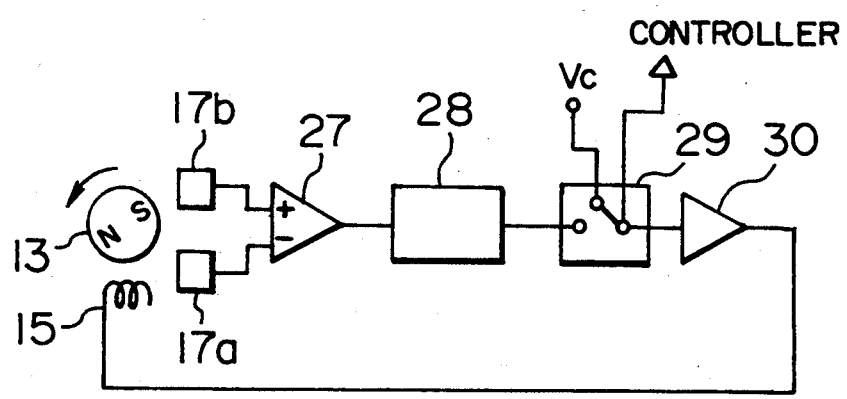
FIG. 8 is a circuit block diagram of the control system for the bias magnetic field generator.

The Hall elements 17a, 17b produce outputs in accordance with the density of the magnetic flux which penetrates each Hall element. The output difference between the two Hall elements 17a, 17b is fed back to the saddle-type coil 15 by the control system shown in FIG. 8. The saddle-type coil 15 is formed of two saddle-coils 15a, 15b in series. A differential amplifier 27 shown in FIG. 8 produces the output difference between the Hall elements 17a, 17b.

The differential output is supplied through a phase-lead compensation circuit 28 to a switching circuit 29. The switching circuit 29 responds to a command from a separately provided controller to select one of a terminal for a constant output Vc and the other terminal which is connected to the phase-lead compensation circuit 28. The output from the switching circuit 29 is amplified by a drive circuit 30, and the output current from the amplifier is caused to flow in the saddle-type coil 15.

The basic operation of the bias magnetic field generator will be described below. The basic operation includes three operations: the detection of the polarity of the bias magnetic field, the detection of the fact that the bias magnet has entered a normal range of angles, and the inversion to a necessary polarity. First, with reference to FIG. 9, a description will be made of the Hall elements 17a, 17b, the sum signal and difference signal therefrom and the strength H of the magnetic field perpendicular to the recording film 1 at the beam spot focused point F when the bias magnet 13 is rotated once from the reference angle A (the line L) shown in FIG. 3. It is assumed that the magnetic field H is equal to or higher than a value necessary for the erasing mode when the bias magnet 13 is in the angular range of 0 degree through $a_1$ degree and $a_4$ degree through 360 degrees and that the magnetic field H is equal to or lower (the absolute value becomes large) than a value necessary for the recording mode when the bias magnet is in the angular range of $a_2$ degree through $a_3$ degree. In addition, it is assumed that the sum output at each angle of $a_1$ through $a_4$ degrees is $S_1$ through $S_4$ and that the differential output at each angle is $D_1$ through $D_4$. Since the magnetic field strength (the component perpendicular to the recording film 1) H at the beam spot focused point F of the recording film 1 and the outputs from the Hall elements 17a, 17b change like a sine wave as shown in FIG. 9, the range of bias magnetic field H suitable for the erasing mode can be confirmed from the fact that the sum output is a larger value of $S_1$, $S_4$ or above, and surely detected from the fact that the differential output D is a value between $D_4$ and $D_1$.

Similarly, the range of bias magnetic field H suitable for the recording mode can be confirmed from the fact that the sum output is a smaller value of $S_2$, $S_3$ (a larger absolute value) or below, and surely detected by the fact that the differential output D is a value between $D_2$ and $D_3$.

Figure 9:
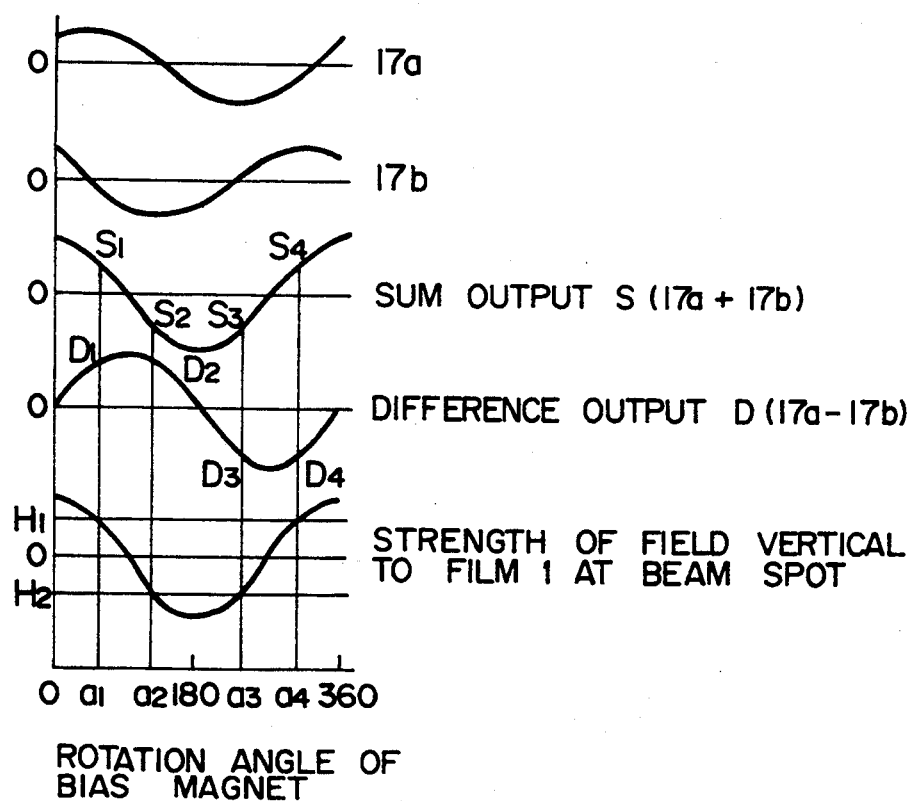
FIG. 9 is a graph showing the relation between each signal and the magnetic field when the bias magnet is turned once.

The polarity of the bias magnetic field can be determined by the value of the sum output since the sum output S changes in the same way as the bias magnetic field H as shown in FIG. 9. In other words, when the sum output is $S_1$ or $S_4$ or above, it is on the erase side, and when the sum output is $S_3$ or $S_1$ or below, it is on the recording side. It is easily understood that the polarity itself can be determined even by the nearest value to the central value of the sum output (, or from the fact that the absolute value of the sum output is the smallest).

When the differential output D is in a range from $D_4$ to $D_1$ or from $D_2$ to $D_3$, the bias magnet is decided to be in a correct range of angle. If the polarity is not necessary to decide, it must be detected for the correct angle range that the differential output S lies between the large value of $D_3$, $D_4$ and the small value of $D_1$, $D_2$.

When the differential output D is zero, the absolute value of the sum output S is the maximum.

Figure 10:
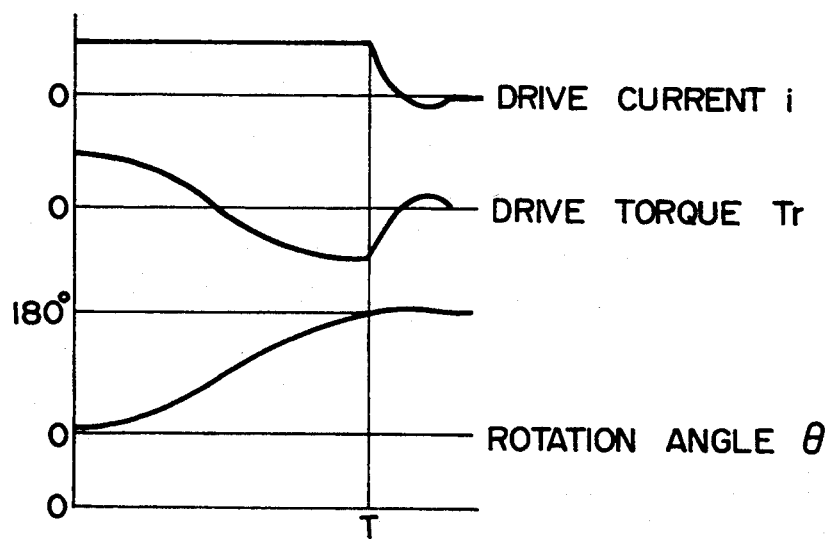
FIG. 10 is a graph showing the relation between the drive current and the rotation of the magnet when the bias magnetic field is reversed.

The inversion of the bias polarity will be mentioned with reference to FIG. 10. The magnetic field applied to the saddle-type coil 15 changes like a sine wave in accordance with the rotation angle of the bias magnet 13. Thus, if a constant drive current i is caused to flow in the saddle-type coil 15, the drive torque, Tr of the bias magnet 13 changes like the magnetic field applied to the saddle-type coil. If the bias magnet 13 starts rotating from the position in which the magnetization direction coincides with the coil-butt region of the saddle-type coil, the drive torque exerted on the bias magnet changes to the decelerating direction when it lies at a rotation angle of 90 degrees or above, and the rotation speed becomes zero when it rotates through 180 degrees. If the same drive current is further caused to flow, the magnet returns to the initial angle. The time, T in which the rotation speed becomes substantially zero from the start of the rotation is predetermined. Then, the switching circuit 29 is changed to the constant input Vc side by the control system shown in FIG. 8, and the bias magnet is rotated until the lapse of the time T. Thereafter, the switching circuit 29 is changed to the phase compensation circuit 28 side position, bringing about the angular position determining control system. Thus, the feedback control system is operated so that the differential output of the Hall elements 17a, 17b is zero, and as a result that the magnet 13 is stably kept at a predetermined angular position. In this way, it is possible to make the inversion and holding of the bias magnetic field. In order to make the bias magnet 13 at a constant initial angular position, it is necessary that when the power supply is turned on the switching circuit 29 shown in FIG. 8 be controlled to change to the phase compensation circuit side position so that the magnetization direction of the bias magnet 13 coincides with the coil-butt region of the saddle-type coil 15.

It can be considered that the magnetic field generated by the current flowing in the saddle-coil 15 is small and has almost no effect on the bias magnetic field or others. If this field is considerably large, the bias magnetic field generator must be designed considering this effect.

In the above embodiment, although the sum output S of the Hall elements 17a, 17b, when the bias magnet 13 lies at a rotation angle 8, changes like a sine wave same as the vertical field strength H at the beam spot focused point on the recording film 1, it does not always change like a sine wave of the same phase depending on the relation between the angular position of the Hall elements relative to the bias magnet 13 and the angular position of the beam spot focused point. Thus, in this case, in order to obtain a sine wave of the same phase, it is necessary to adjust the angular position of the mounted Hall elements 17a, 17b or the output phase of the Hall elements 17a, 17b.

In addition, the two-dimensional actuator has provided therein a mechanism for preventing excess friction force from generating in the pin support mechanism by cancelling out the effect of the gravity by the force of a magnet when the apparatus is placed with its top up. This mechanism is designed to be able to rotate under the action from the outside of the apparatus, and to affect the two-dimensional actuator only when the apparatus is placed with its top up. Thus, the magnetooptical-disk recording and/or recording apparatus according to this embodiment can be stably operated not only when it is placed on its top up but also when it is placed with its side down.

FIGS. 11A and 11B show examples of the use of the magnetooptical-disk recording and/or reproducing apparatus of the invention in an information processing system such as a drawing retrieval system. FIG. 11A shows an example of the use in which the magnetooptical-disk recording and/or reproducing apparatus 116 is placed with its side down, and FIG. 11B shows the other example of the use in which the magnetooptical-disk recording and/or reproducing apparatus 116 is placed with its top up. In this drawing retrieval system, the drawings registered in the magnetooptical-disk medium can be retrieved by a key board 117, and the selected diagram can be indicated on a display 118 so that the user can examine the details of the drawing. If a scanner or printer, though not shown, is connected to this system, it is possible to construct a drawing management system in which the drawings can be registered, retrieved and printed.

The environment in which the magnetooptical-disk recording and/or reproducing apparatus of the invention is used as in the drawing retrieval system shown in FIGS. 11A and 11B is like the general office which does not so consider the effect of dust. Therefore, the improvement in the dust prevention is one of the main subjects for the development of the magnetooptical-disk recording and/or reproducing apparatus.

With reference to FIG. 12, a description will be made of the dust resistance improvement in the magnetooptical-disk recording and/or reproducing apparatus of the invention. In order to increase the dust resistance of the magnetooptical-disk recording and/or reproducing apparatus, it is most effective to place the disk and the movable portion of the optical head in a single, tightly closed box as is clear from the results of many experiments for dust resistance which were conducted by the present inventors. The magnetooptical-disk recording and/or reproducing apparatus of the invention has a feature in the disk exchangeability, and needs that the disk (cartridge) be inserted in and ejected from the apparatus. Thus, it is difficult to make the apparatus completely tight like the magnetic disk recording and/or reproducing apparatus, but it is possible to make it quasi-tight.

FIG. 12 is a perspective view of one example of the magnetooptical-disk recording and/or reproducing apparatus of the invention. In FIG. 12, the portions which are not concerned with the dust resistance improvement are omitted. As described with reference to FIGS. 2A and 2B, the front panel 101 is provided on the front of the apparatus, and the slot 102 for the cartridge which is provided in the front panel 101 has a double flap provided. This double flap almost suppresses dust from entering the apparatus through the slot 102. The top and sides of the apparatus are surrounded by a metal plate cover 123 so that dust can be absolutely shut off. A partition wall 124 is provided at the back of the apparatus to lie between the fixed portion 106 and movable portion 107 of the optical head shown in FIG. 2. The partition wall 124 has an aperture of about 6 mm in diameter bored through which the laser beam is passed, but this aperture is blocked by a glass plate 125 which the laser beam can penetrate so that dust can be prevented from entering the apparatus from the back. Also, the circuit board 104 is provided on the underside of the apparatus so as to block dust not to enter the apparatus. However, even under these countermeasures the metal plate cover 123 and the circuit board 104 are produced with a poor accuracy, or have gaps through which dust may probably enter. Therefore, a packing 126 for preventing dust not to enter are provided on the places where the gaps are easy to occur, such as the junctions between the metal plate cover 123 and the partition wall 124 and between the partition wall 124 and the circuit board 104. Since the surrounding of the housing in which the disk cartridge and the movable portion of the optical head are placed is almost completely tightly closed, the dust resistance can be increased ten times or above as compared with the conventional apparatus.

Figure 13:
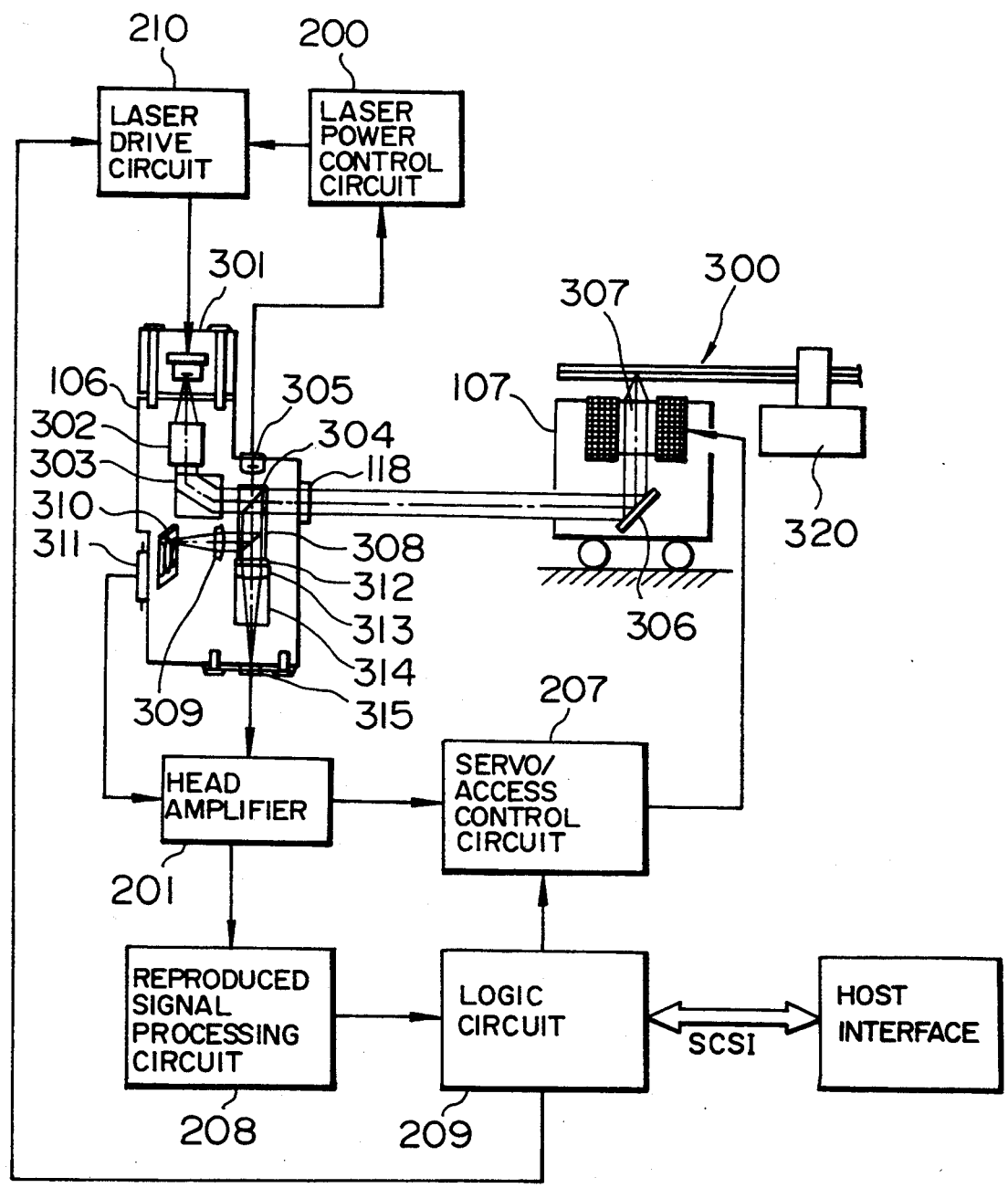
FIG. 13 is a circuit block diagram useful for explaining the recording and reproducing operations.

FIG. 13 is a basic circuit block diagram useful for explaining the recording and reproducing operations of the magnetooptical-disk recording and/or reproducing apparatus of the invention. A magnetooptical-disk 300 of which the recording film is made of a TbFeCo-based perpendicular magnetic film is rotated at 3000 rpm by a spindle 320 and information is recorded, reproduced and erased from the rotating disk by the optical head.

The optical head for recording and reproducing can be divided into the fixed portion 106 and the movable portion 107. The fixed portion 106 has mounted thereon a high-power semiconductor laser 301 which generates a laser beam of 30 mV, maximum and of a wavelength of 780 nm. The laser beam emitted from the semiconductor laser 301 is converted into a parallel beam by a collimator lens 302, and further converted into a parallel beam of substantially a circular shape by a beam shaping prism 303. This parallel beam is incident to a first beam splitter 304. A part of the incident beam to the first beam splitter 304 is reflected therefrom into a first optical detector 305, and the remaining part is passed through the beam splitter and conducted through a dust preventing glass plate 118 to the movable portion 107 of the optical head. The movable portion 107 has a mirror 306 fixed. The laser beam reflected from the mirror 306 toward the disk 300 is focused by a focus lens 307 which is supported on the two-dimensional actuator, and passed through the base of the disk 300 to form a beam spot on the recording film.

The laser beam reflected from the recording film of the disk 300 is passed through the focus lens 307, mirror 306 and glass plate 118 and incident to the first beam splitter 304 of the fixed portion 106. A part of the incident beam is reflected therefrom. The laser beam reflected from the first beam splitter 304 is incident to a second splitter 308. A part of the incident beam is reflected therefrom and converted into a focused beam by a first convex lens 309. Then, the focused beam is separated into two perpendicular polarized beams by a macro PBS (polarized beam splitter) 310, and the two polarized beams are incident to an optical detector 311 having two independent photosensitive portions. The laser beam passed through the second beam splitter is converted into a focused beam by a diffracting lattice 312 and a second convex lens 313. The focused beam is passed through a cylindrical lens 314 and incident to a third optical detector 315 which has eight independent photosensitive portions.

The output from the first optical detector 305 is supplied to a laser power control circuit 200. The laser power control circuit 200 generates a laser power control signal on the basis of the output from the first optical detector 305. This laser power control signal is supplied to the laser drive circuit 210, controlling the laser power upon reproduction to be constant. In this embodiment, the output from the focusing lens 307 is controlled to have a power of 1.5 mW.

The second optical detector 311 has two independent photosensitive portions, and thus produces two separate outputs, which are supplied to a head amplifier 201. The third optical detector 315 has eight independent photosensitive portions, and thus produces eight separate outputs, which are supplied to the head amplifier 201.

Figure 14:
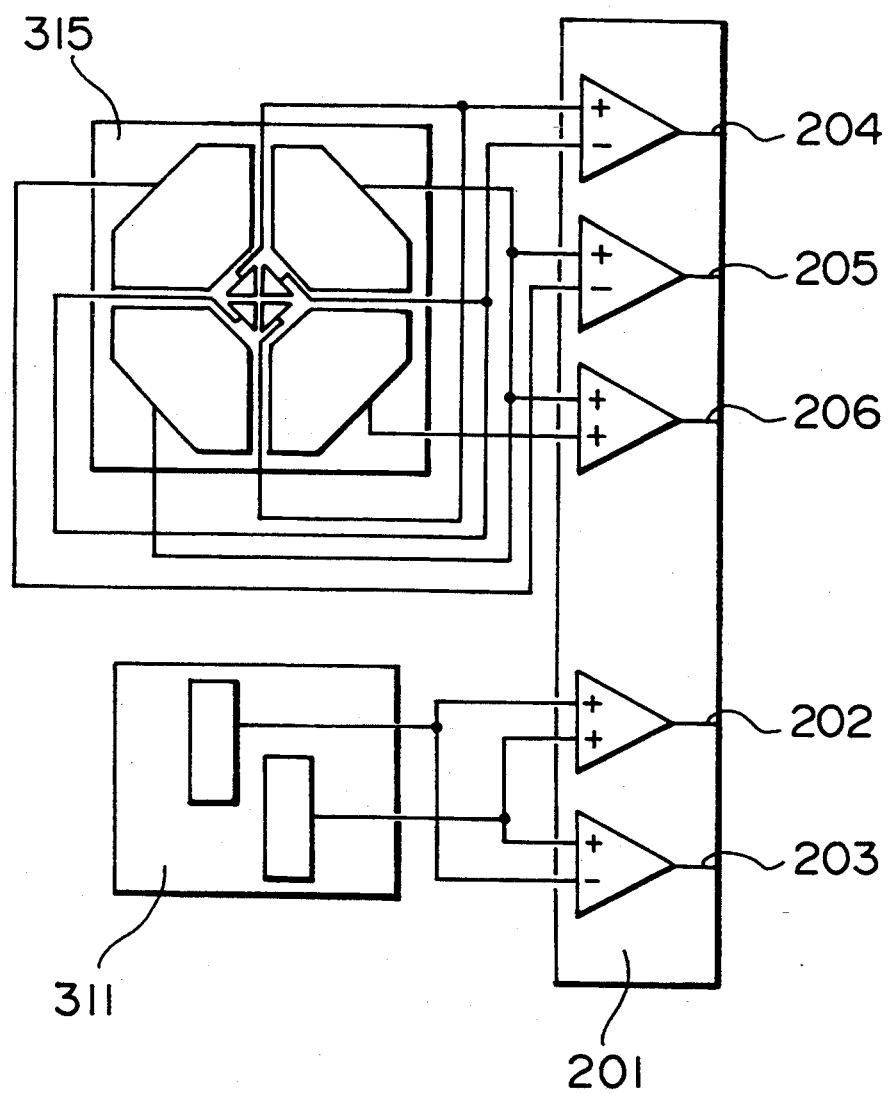
FIG. 14 is a circuit block diagram of one example of the photoelectric converter of the optical head.

FIG. 14 shows the shapes of the respective photosensitive portions of the second optical detector 311 and third optical detector 315, and the basic construction of the head amplifier 201. A sum signal 202 of two outputs from the second optical detector 311 is used to reproduce the preformat signal which is formed at the very small pits on the base of the disk 300. The preformat signal is a header signal including information of the track address and sector address. A differential signal 203 of the two outputs is used to reproduce a magnetooptical signal recorded on the perpendicularly magnetized film. A signal 204, of the addition and subtraction of the outputs of the inner four photosensitive portions shown in FIG. 14, of the eight photosensitive portions of the third optical detector 315, is used as a focus servo signal. A signal 205 of the addition and subtraction of the outputs of the outer four photosensitive portions is used as a tracking servo signal. A signal 206 of all addition of the outputs of the outer four photosensitive portions is used to detect a track cross signal together with the signal 205.

The signals 204 and 205 are supplied to a servo/access control circuit 207 and drives the two-dimensional actuator 11 which is mounted on the movable portion 7 of the optical head, so that the focus servo and tracking servo can be performed stably. The signal 206 is also supplied to the servo/access control circuit 207 and used for access control together with the signal 205.

As to the reproduction of the information from the disk 300, the signal 202 or 203 of the addition or subtraction of the outputs from the second optical detector 315 is supplied to a reproduced signal processing circuit 208 where the data are discriminated. The output from the reproduced signal processing circuit is fed together with the reproduction clock to a logic circuit 209 where a logic process such as demodulation of (1-7) RLL code and error correction by an ECC code is performed. The data from the logic circuit is supplied through the SCSI interface to the high-level apparatus.

As to the recording of information on the disk 300, if the information being recorded on the disk from the high-level apparatus is received by the logic circuit 209 through the SCSI interface, the logic circuit 209 makes (1-7) RLL modulation and addition of an ECC code and so on, thereby converting it into a signal to be recorded on the disk. This signal is supplied to a laser drive circuit 210. The laser drive circuit 210 responds to the signal from the logic circuit 209 to cause a certain current to flow in the semiconductor laser 301, thereby intensively exciting the laser so that information can be recorded on the disk. At this time, the magnet for recording and erasing is controlled to generate a magnetic field for recording by a rotation control circuit 211 for the magnet in response to the command from the logic circuit 209.

In order that the information recorded on the disk is erased, the laser drive circuit 210 causes a direct current to flow in the semiconductor laser 300 under the control of the logic circuit 209, thereby extensively exciting the laser 300. At this time, the rotation control circuit 211 responds to a command from the logic circuit 209 to cause the magnet for recording and erasing to generate a magnetic field for erasing.

The recording, reproducing and erasing operations have been briefly described above. The technique for the recording, reproducing and erasing operations according to this invention will be mentioned in detail with reference to drawings.

In the ZCAV recording system, the user's region on the disk is divided into a plurality of zones in the radius direction, and the number of sectors per track is changed for each zone.

FIGS. 15 and 16 show one example of the division of the user's region into zones. In FIG. 15, the user capacity per sector is 1024 bytes, the format capacity (total capacity) is 1409 bytes, and the number of tracks per zone in 748. In FIG. 16, the user capacity per sector is 512 bytes, the format capacity (total capacity) is 801 bytes, and the number of tracks per zone is 403. For both cases, before recording of information, it is modulated by the (1-7) RLL code. The disk is rotated at a rate of 3000 rpm. For both cases, the track pitch is 1.34 μm, and the user's region is in a range from 60 mm to 120 mm in diameter. From FIGS. 15 and 16, it will be understood that in this embodiment the difference between the numbers of sectors in adjacent zones is 1, and that the frequency of the necessary clock for recording and reproduction is proportional to the number of sectors per track.

Figure 17:
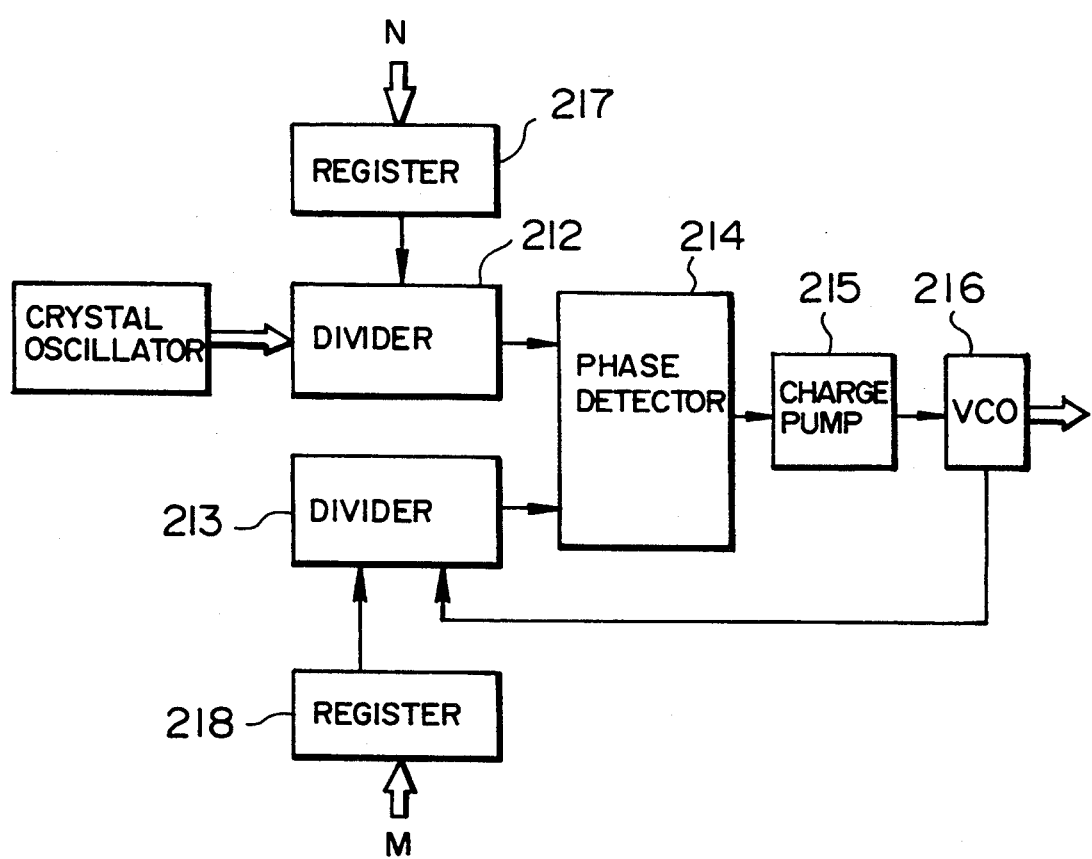
FIG. 17 is a circuit block diagram of one example of the synthesizer.

FIG. 17 is a basic circuit block diagram of the synthesizer. Referring to FIG. 17, there are shown frequency dividing circuits 212, 213, a phase detector 214, a charge pump 215, and a voltage controlled oscillator 216 (VCO). The frequency dividing ratios of the frequency dividing circuits 212, 213 are determined by integers N and M which are set in registers 217, 218, respectively. Usually, the output signal from a crystal oscillator is supplied to the synthesizer. If the oscillation frequency of the oscillator is represented by Fin, the frequency of the output from the synthesizer is the Fin multiplied by M/N.

Therefore, if M is selected to be equal to the number of sectors per track or an integer multiple of the sector number, and if Fin and N are arbitrarily selected, the clocks for all zones in the ZCAV recording system can be theoretically obtained by simply changing the value of M. For example, for the case of zone division shown in FIG. 15, the oscillation frequency Fin of the crystal oscillator, N and M are set to 11.413 MHz, 27 and twice the number of sectors per track, respectively. For the case of zone division shown in FIG. 16, the oscillation frequency Fin of the crystal oscillator, N and M are set to 12.976 MHz, 27 and the number of sectors per track, respectively.

Thus, if two crystal oscillators are provided and switched, both cases can be supported in which the user capacity per sector in FIG. 15 is 1024 bytes and that in FIG. 16 is 512 bytes.

When the disk standardized by the ISO/IEC 10089 specification is rotated at a rate of 300 rpm, the frequency of the clock necessary for the recording and reproduction is 18.495 MHz. If the crystal oscillator of 11.413 MHz is used and if N and M are set to 93, a clock frequency of about twice that, or 36.994 MHz can be obtained. Thus, the frequency of this signal is divided by 2 by use of a known frequency dividing circuit. Consequently, it will be understood that a new crystal oscillator is not necessary for recording and reproducing the disk which is standardized by the ISO/IEC 10089. In the example shown in FIG. 15, the format capacity per sector is selected not to need a new crystal oscillator.

Figure 18:
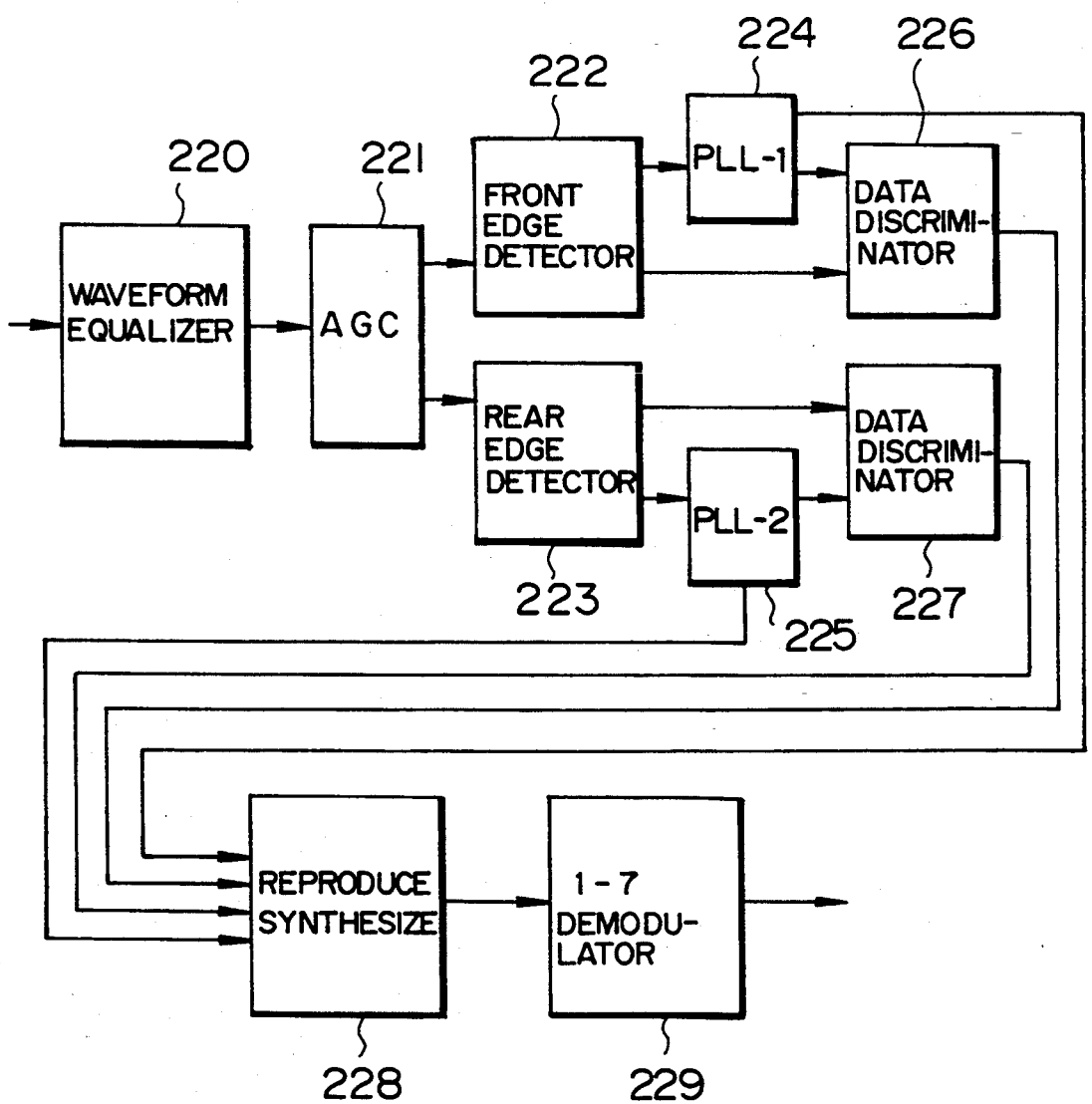
FIG. 18 is a circuit block diagram of one example of the reproduced signal processing circuit.

FIG. 18 is a basic circuit block diagram of the reproduced signal processing circuit 208 shown in FIG. 13. The output 202 or 203 from the head amplifier 201 is supplied to the reproduced signal processing circuit 208. First, a waveform equalizing circuit 220 corrects the linear distortion of the waveform what is called the intercode interference. An automatic gain control (AGC) circuit 221 adjusts the amplitude of the reproduced signal of the densest pattern to be constant. Then, edge detecting circuits 222 and 223 detect the front edge and rear edge, respectively. The outputs from the edge detecting circuits 222 and 223 are respectively supplied to their PLLs which produce reproduction clocks in synchronism with the front edge and the rear edge. Since the two PLLs are simultaneously operated, this system is called the double PLL. Data discrimination circuits 226 and 227 discriminate the presence or absence, or 1, 0 of the edge signals by the reproduction clocks which are generated from the PLL circuits 224 and 225. The outputs from the data discrimination circuits 226 and 227 are supplied together with the reproduction clocks to a reproduction synthesizing circuit 228 of the logic circuit 209 shown in FIG. 13, where a normal binary signal of 1, 0 is produced. The timing in which the two signals are compounded is detected from the VFO portion (determined by the timing of the front edge and rear edge) at the head of the recorded data. The output from the reproduction synthesizing circuit 228 which is a normal binary signal of 1, 0, is demodulated into the original data by a (1-7) RLL demodulation circuit 229. The data is processed to undergo error correction by an ECC code, and then the user data is extracted from the data.

In the case of the mark position recording, although the output from the head amplifier is necessary to be first differentiated by a differentiation circuit and processed for AGC or the like, this invention does not use any differentiation circuit as will be obvious from the above description. Here, this system is called the original waveform reproduction system.

Figure 19:
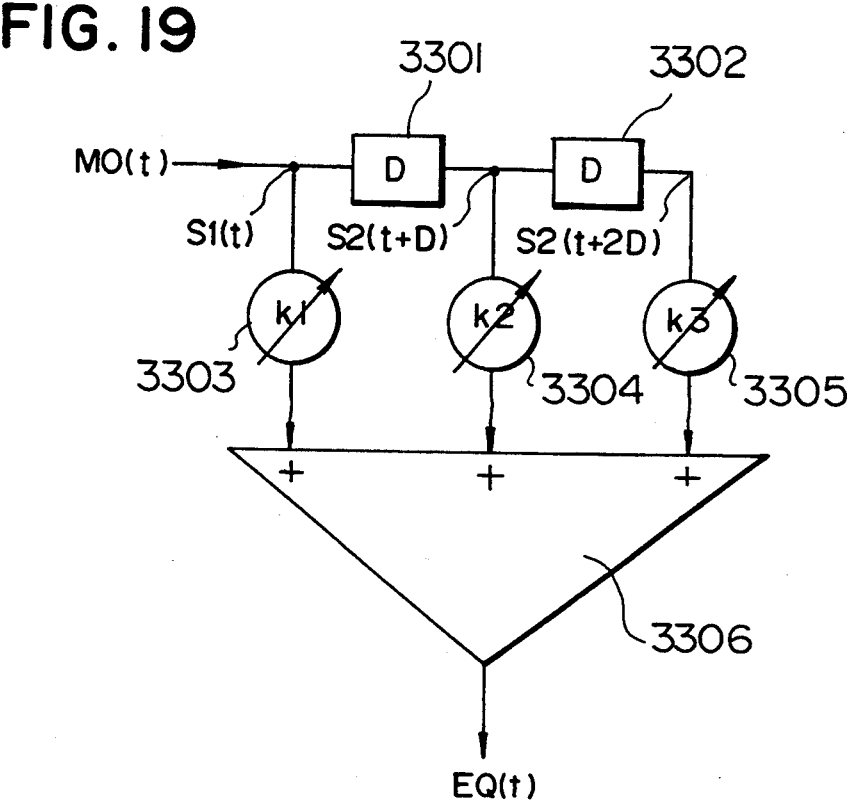
FIG. 19 is a circuit block diagram of one example of the equalizing circuit.
Figure 20:
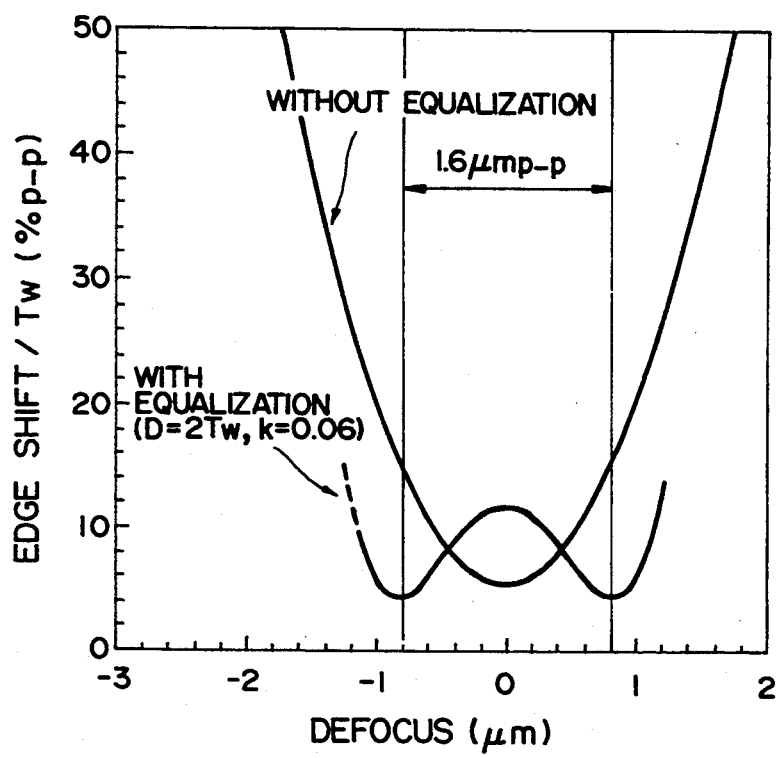
FIG. 20 is a graph for explaining the effect of the equalizing circuit.

The fundamental operation of the waveform equalizing circuit 220 and the effect thereof will be described in detail with reference to FIGS. 19 and 20. FIG. 19 is a basic circuit block diagram of an example of the waveform equalizing circuit 220, or a three-tap transversal filter. The output 202 or 203 from the head amplifier 201 is supplied to variable delay elements 3301 and 3302, in serial order so that three different signals $S1(t)$, $S2(t+D)$, $S3(t+2D)$ where t is time can be produced as a result of delaying it by D (ns) in each element. The signals $S1(t)$, $S2(t+D)$, $S3(t+2D)$ are amplified by a factors of K1, K2 and K3, respectively, and then fed to an adder 3306 which produces an equalization output EQ(t). According to an experiment, when delay D is equal to the period (80 ns for the innermost periphery, 40 ns for the outermost periphery) of the reproduction clock and when K2, K1 and K3 are selected to be 1, 0.06 and 0.06, respectively, the best result can be obtained. FIG. 20 shows the result of the experiment.

This invention employs the 1-7 modulation system. The prior art employs the 2-7 modulation system for the magnetooptical-disk. FIG. 21 shows the rule of the 1-7 modulation system, and FIG. 22 shows the comparison between the characteristics of the 1-7 modulation system and 2-7 modulation system. From FIG. 22 it will be seen that the 1-7 modulation system is more advantageous for high density recording.

The trial writing control system in this invention will be mentioned below.

The trial writing control is intended to remove the factors of deterioration of the recorded state such as the environmental temperature change, sensitivity dispersion of recording disks and characteristics dispersion of recording apparatus. This trial writing control system is one of the very effective systems for achieving a large storage capacity of 1 GB/side or above.

The trial writing control is fundamentally to alternately record the repetitive closest pattern and coarsest pattern and detect the difference $\Delta V$ between the central levels of the reproduced signal. As shown in FIG. 23C, the difference $\Delta V$ changes with the change of recording power, P1 through P8. In this embodiment, the recording power P4 for $\Delta V=0$ is the optimum recording power. In practice, the disk has a trial-writing region in each zone of ZCAV (specifically in one or two tracks). The special pattern mentioned above is recorded in a plurality of sectors of the trial writing region with the recording power being slightly changed for each sector. Then, the plurality of recorded sectors are reproduced. The reproduced signal central level of the closest pattern is detected from the reproduced signal including the closest pattern and the coarsest pattern (FIG. 23A) by a sample pulse (SAMPLE 1-P) of FIG. 23B for the closest pattern. The reproduced signal central level of the coarsest pattern is detected therefrom by a sample pulse (SAMPLE 2-P) for the coarsest pattern. The $\Delta V$ of each sector is obtained from the difference between both the central levels. The recording power for $\Delta V=0$ is calculated and the calculated value of recording power is stored in a memory within the apparatus and used until the next trial writing is performed. Since the recording power is generally changed for each zone, the value of the recording power is calculated in each of the three zones of the inner, medium and outer peripheries upon insertion of disk, and the values of the recording power in the other zones are determined by linear approximation from the values which were calculated in the three zones. After the insertion of the disk, the trial writing is made in proper zones at every constant time, for example, every five minutes, and the values stored in the memory are corrected. The erasing power is also changed in association with the recording power which was obtained in the trial writing. This trial writing control is also performed as one of the error recoveries when a recording error or erasing error occurs, thereby increasing the reliability of the recording and erasing operations.

When the interfaces SCSI-1 and SCSI-2 to the high-level apparatus are simultaneously supported, a problem is caused with the switching of SCSI commands. The process for the simultaneous supporting is usually complicated by the facts that the commands for supporting the SCSI-1 and SCSI-2 are different, that the interfaces are supported by the same command but differently processed, and that the SCSI bus is disconnected or connected depending on the contents of the processing. In order to avoid these facts, this invention makes a table of the support commands. FIG. 24 shows one example of the table. In this table, flags of 8 bits are provided for the commands of 00 through FF. The most significant bit of each flag indicates to support/not to support, and the second bit indicates to disconnect/not to disconnect the SCSI bus. The remaining six bits indicate the contents of the command. The SCSI-1 or SCSI-2 can be selected not only by normally switching the set positions of the jumper pins which are mounted in the apparatus, but also by the command of SCSI (change definition).

We claim:

1. A magnetooptical-disk recording and/or reproducing apparatus comprising:
   a 5.25 inch magnetooptical-disk having a storage capacity of at least 1 GB/side with a ZCAV (Zoned Constant Angular Velocity) format in which a recording area is divided in a plurality of zones in a radius direction so that a recording density of each zone is substantially constant independent of said radius direction; and
   means for producing a recording mark with edges having information, the recording mark producing means including:
   a double Phase Locked Loop for independently discriminating data independently applied to a front edge and a tail edge,
   a trail writing control means for controlling setting of a recording power in accordance with previously writing data in at least one regions of said magnetooptical-disk,
   a 1-7 modulation means for converting information to be recorded into a Run Length Limiting code, and
   a direct edge detection means in which a gain of a reproduced signal from said magnetooptical-disk is automatically adjusted by equalizing said reproduced signal without differentiating.

2. A magnetooptical-disk recording and/or reproducing apparatus according to claim 1, wherein a magnet or electromagnetic coil for generating a magnetic field for recording and/or erasing is disposed on the same side as an optical head for generating a beam spot for recording and reproduction, relative to said disk.

3. A magnetooptical-disk recording and/or reproducing apparatus according to claim 1, wherein a plurality of tapped holes by which said magnetooptical-disk recording and/or reproducing apparatus is fixed within a housing are provided on lateral sides and bottom sides of said apparatus at the same positions as a magnetic disk recording and/or reproducing apparatus of equal size as that of said magnetooptical-disk recording and/or reproducing apparatus and having a SCSI-2 interface to a high-level apparatus and supporting a SCSI-1 interface.

4. A magnetooptical-disk recording and/or reproducing apparatus according to claim 1, wherein a cartridge including said disk which is loaded within said magnetooptical-disk recording and/or reproducing apparatus, and the movable portion of an optical head are housed in a tightly closed structure, and a circuit board having a substantial part of a circuit system for making a recording and reproducing process is mounted on an underside (on the opposite side of the optical head to said disk) of said tightly closed structure of said apparatus.

5. A magnetooptical-disk recording and/or reproducing apparatus according to claim 1, wherein a magnetooptical-disk standardized by ISO/IEC 10089 specification can be recorded and/or reproduced without providing another crystal oscillator.

6. A half height magnetooptical-disk recording and/or reproducing apparatus comprising:

a magnetooptical-disk having a storage capacity of at least 1 GB/side with a Zoned Constant Angular Velocity formatting in which a recording area is divided in a plurality of zones in a radial direction with a substantially constant recording density;

a movable head including an object lens which forms a small optical spot on a recording film of said magnetooptical-disk, said object lens facing a recording medium of said magnetooptical-disk;

a bias magnetic field applying means for rotating a permanent magnet and inverting polarities of a bias magnetic field perpendicular to said recording film, said bias magnetic field applying means being mounted in said movable head, said bias magnetic field applying means having a height which is less than a height of a driving apparatus for said object lens and being on a common side of said magnetooptical-disk with said object lens; and means for producing a recording mark including Phase Locked Loop means for independently discriminating data applied to a front edge and a tail edge, a trial writing control means for controlling a recording power setting in accordance with previously writing data in one or more regions of said magnetooptical-disk, a modulation means for converting information to be recorded into a Run Length Limiting code, and a direct edge detection means for automatically adjusting a gain of a reproduced signal from said magnetooptical-disk.

7. A magnetooptical-disk recording and/or reproducing apparatus according to claim 6, wherein said bias magnetic field applying means is disposed in parallel with a surface of said magnetooptical-disk and on a side opposite of said object lens to said driving apparatus of said object lens and support means.

8. A magnetooptical-disk recording and/or reproducing apparatus according to claim 7, wherein said permanent magnet and said bias magnetic field applying means for rotating said permanent magnet are housed in a tightly closed container.

9. A magnetooptical-disk recording and/or reproducing apparatus according to claim 8, wherein a drive coil for driving said permanent magnet is integrally buried in said tightly closed container for housing said bias magnetic field applying means as a part of said tightly closed container.

10. A magnetooptical-disk recording and/or reproducing apparatus according to claim 6, wherein said permanent magnet of said bias magnetic field applying means is formed as a rotor to be rotatable by an interaction of a magnetic field from said permanent magnet and a drive current flowing in the drive coil of said permanent magnet.

11. A magnetooptical-disk recording and/or reproducing apparatus according to claim 10, wherein said permanent magnet of said bias magnetic field applying means is magnetized in a rotation diameter direction and the drive coil of said permanent magnet has a portion which faces an N-pole and S-pole of said permanent magnet and is parallel to a rotation axis of said permanent magnet.

12. A magnetooptical-disk recording and/or reproducing apparatus comprising:

a movable head having an object lens provided to face said magnetooptical-disk and form a very small beam spot on a recording film of said disk;

a bias magnetic field generator for rotating a permanent magnet to invert a polarity of a bias magnetic field perpendicular to said recording film, said bias magnetic field generator being mounted on said movable head being disposed on said object lens side of said magnetooptical-disk and to be lower than a height of an object lens drive actuator, said permanent magnet of said bias magnetic field generator being formed as a rotor to be rotatable by an interaction of a magnetic field from said permanent magnet and a drive current flowing in a drive coil of said permanent magnet, said permanent magnet of said bias magnetic field generator being magnetized in a rotation diameter direction and the drive coil of said permanent magnet having a portion facing an N-pole and S-pole of said permanent magnet and being parallel to a rotation axis of said permanent magnet, said permanent magnet of said bias magnetic field generator being disposed on an opposite side of said object lens from the object lens drive and support means of said object lens and the rotation axis of said permanent magnet being parallel to a surface of said magnetooptical-disk and in a radius direction of said magnetooptical-disk.

* * * * *